US012581051B2

(12) United States Patent
Won et al.

(10) Patent No.: US 12,581,051 B2
(45) Date of Patent: Mar. 17, 2026

(54) DISPLAY DEVICE AND METHOD FOR PROVIDING STEREOSCOPIC IMAGE THE SAME

(71) Applicant: SAMSUNG DISPLAY CO., LTD., Yongin-si (KR)

(72) Inventors: Byeong Hee Won, Yongin-si (KR); Beom Shik Kim, Yongin-si (KR); Su Bin Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 301 days.

(21) Appl. No.: 18/334,865

(22) Filed: Jun. 14, 2023

(65) Prior Publication Data

US 2023/0412790 A1 Dec. 21, 2023

(30) Foreign Application Priority Data

Jun. 15, 2022 (KR) ........................ 10-2022-0072558

(51) Int. Cl.
| | |
|---|---|
| *H04N 13/349* | (2018.01) |
| *H04N 13/305* | (2018.01) |
| *H04N 13/398* | (2018.01) |
| *H04N 13/344* | (2018.01) |

(52) U.S. Cl.
CPC ......... *H04N 13/305* (2018.05); *H04N 13/349* (2018.05); *H04N 13/398* (2018.05); *H04N 13/344* (2018.05)

(58) Field of Classification Search
CPC .. H04N 13/305; H04N 13/349; H04N 13/398; H04N 13/344
See application file for complete search history.

(56) References Cited

U.S. PATENT DOCUMENTS

| | | | | |
|---|---|---|---|---|
| 8,982,193 | B2 * | 3/2015 | Cho ........................ | G09G 3/003 348/51 |
| 10,509,232 | B2 * | 12/2019 | Lee ......................... | G09G 3/003 |
| 2012/0182290 | A1 * | 7/2012 | Takahashi .............. | G02B 30/27 345/419 |
| 2013/0141402 | A1 * | 6/2013 | Lee ........................ | G02B 5/3083 345/204 |
| 2014/0146143 | A1 * | 5/2014 | Park ...................... | H04N 13/317 348/51 |
| 2014/0375621 | A1 * | 12/2014 | Lee ........................ | G09G 3/003 345/212 |

(Continued)

FOREIGN PATENT DOCUMENTS

| | | |
|---|---|---|
| KR | 10-2218777 | 2/2021 |
| KR | 3 10-2023-01367 | 9/2023 |

*Primary Examiner* — Mohamed A. Wasel

(74) *Attorney, Agent, or Firm* — F. CHAU & ASSOCIATES, LLC

(57) ABSTRACT

A method for providing a stereoscopic image of a display device includes receiving, by a display panel that includes first to N-th sub-pixels, wherein N is a positive integer that is greater than or equal to 2, first to M-th view input data that correspond to first to M-th view images, wherein M is a positive integer that satisfies M>N, allocating the first to M-th view input data to the first to N-th sub-pixels as corresponding first to N-th view image data in a first mode, and displaying, by plurality of lenses disposed on the display panel, a light field image in the first to N-th sub-pixels according to the first to N-th view image data.

20 Claims, 27 Drawing Sheets

(56)     References Cited

U.S. PATENT DOCUMENTS

2015/0341623 A1* 11/2015 Kim ...................... G02B 30/27
                                                           348/59
2019/0265492 A1*  8/2019 Yuuki ................... H04N 13/31
2023/0328221 A1   10/2023 Won et al.

* cited by examiner

| | | | | |
|---|---|---|---|---|
| 16 | 3 | 6 | 9 | 12 |
| 15 | 2 | 5 | 8 | 11 |
| 14 | 1 | 4 | 7 | 10 |
| 13 | 16 | 3 | 6 | 9 |
| 12 | 15 | 2 | 5 | 8 |
| 11 | 14 | 1 | 4 | 7 |
| 10 | 13 | 16 | 3 | 6 |
| 9 | 12 | 15 | 2 | 5 |
| 8 | 11 | 14 | 1 | 4 |
| 7 | 10 | 13 | 16 | 3 |
| 6 | 9 | 12 | 15 | 2 |
| 5 | 8 | 11 | 14 | 1 |
| 4 | 7 | 10 | 13 | 16 |
| 3 | 6 | 9 | 12 | 15 |
| 2 | 5 | 8 | 11 | 14 |
| 1 | 4 | 7 | 10 | 13 |
| 16 | 3 | 6 | 9 | 12 |
| 15 | 2 | 5 | 8 | 11 |
| 14 | 1 | 4 | 7 | 10 |
| 13 | 16 | 3 | 6 | 9 |
| 12 | 15 | 2 | 5 | 8 |
| 11 | 14 | 1 | 4 | 7 |
| 10 | 13 | 16 | 3 | 6 |
| 9 | 12 | 15 | 2 | 5 |
| 8 | 11 | 14 | 1 | 4 |

| VD24 | VD11 | VD14 | VD17 | VD20 |
|------|------|------|------|------|
| VD23 | VD10 | VD13 | VD16 | VD19 |
| VD22 | VD9  | VD12 | VD15 | VD18 |
| VD21 | VD24 | VD11 | VD14 | VD17 |
| VD20 | VD23 | VD10 | VD13 | VD16 |
| VD19 | VD22 | VD9  | VD12 | VD15 |
| VD18 | VD21 | VD24 | VD11 | VD14 |
| VD17 | VD20 | VD23 | VD10 | VD13 |
| VD16 | VD19 | VD22 | VD9  | VD12 |
| VD15 | VD18 | VD21 | VD24 | VD11 |
| VD14 | VD17 | VD20 | VD23 | VD10 |
| VD13 | VD16 | VD19 | VD22 | VD9  |
| VD12 | VD15 | VD18 | VD21 | VD24 |
| VD11 | VD14 | VD17 | VD20 | VD23 |
| VD10 | VD13 | VD16 | VD19 | VD22 |
| VD9  | VD12 | VD15 | VD18 | VD21 |
| VD24 | VD11 | VD14 | VD17 | VD20 |
| VD23 | VD10 | VD13 | VD16 | VD19 |
| VD22 | VD9  | VD12 | VD15 | VD18 |
| VD21 | VD24 | VD11 | VD14 | VD17 |
| VD20 | VD23 | VD10 | VD13 | VD16 |
| VD19 | VD22 | VD9  | VD12 | VD15 |
| VD18 | VD21 | VD24 | VD11 | VD14 |
| VD17 | VD20 | VD23 | VD10 | VD13 |
| VD16 | VD19 | VD22 | VD9  | VD12 |

| VD31.5 | VD5.5 | VD11.5 | VD17.5 | VD23.5 |
|--------|-------|--------|--------|--------|
| VD29.5 | VD3.5 | VD9.5 | VD15.5 | VD21.5 |
| VD27.5 | VD1.5 | VD7.5 | VD13.5 | VD19.5 |
| VD25.5 | VD31.5 | VD5.5 | VD11.5 | VD17.5 |
| VD23.5 | VD29.5 | VD3.5 | VD9.5 | VD15.5 |
| VD21.5 | VD27.5 | VD1.5 | VD7.5 | VD13.5 |
| VD19.5 | VD25.5 | VD31.5 | VD5.5 | VD11.5 |
| VD17.5 | VD23.5 | VD29.5 | VD3.5 | VD9.5 |
| VD15.5 | VD21.5 | VD27.5 | VD1.5 | VD7.5 |
| VD13.5 | VD19.5 | VD25.5 | VD31.5 | VD5.5 |
| VD11.5 | VD17.5 | VD23.5 | VD29.5 | VD3.5 |
| VD9.5 | VD15.5 | VD21.5 | VD27.5 | VD1.5 |
| VD7.5 | VD13.5 | VD19.5 | VD25.5 | VD31.5 |
| VD5.5 | VD11.5 | VD17.5 | VD23.5 | VD29.5 |
| VD3.5 | VD9.5 | VD15.5 | VD21.5 | VD27.5 |
| VD1.5 | VD7.5 | VD13.5 | VD19.5 | VD25.5 |
| VD31.5 | VD5.5 | VD11.5 | VD17.5 | VD23.5 |
| VD29.5 | VD3.5 | VD9.5 | VD15.5 | VD21.5 |
| VD27.5 | VD1.5 | VD7.5 | VD13.5 | VD19.5 |
| VD25.5 | VD31.5 | VD5.5 | VD11.5 | VD17.5 |
| VD23.5 | VD29.5 | VD3.5 | VD9.5 | VD15.5 |
| VD21.5 | VD27.5 | VD1.5 | VD7.5 | VD13.5 |
| VD19.5 | VD25.5 | VD31.5 | VD5.5 | VD11.5 |
| VD17.5 | VD23.5 | VD29.5 | VD3.5 | VD9.5 |
| VD15.5 | VD21.5 | VD27.5 | VD1.5 | VD7.5 |

FIG. 15

| | | | | |
|------|------|------|------|------|
| VD31 | VD5  | VD11 | VD17 | VD23 |
| VD29 | VD3  | VD9  | VD15 | VD21 |
| VD27 | VD1  | VD7  | VD13 | VD19 |
| VD25 | VD31 | VD5  | VD11 | VD17 |
| VD23 | VD29 | VD3  | VD9  | VD15 |
| VD21 | VD27 | VD1  | VD7  | VD13 |
| VD19 | VD25 | VD31 | VD5  | VD11 |
| VD17 | VD23 | VD29 | VD3  | VD9  |
| VD15 | VD21 | VD27 | VD1  | VD7  |
| VD13 | VD19 | VD25 | VD31 | VD5  |
| VD11 | VD17 | VD23 | VD29 | VD3  |
| VD9  | VD15 | VD21 | VD27 | VD1  |
| VD7  | VD13 | VD19 | VD25 | VD31 |
| VD5  | VD11 | VD17 | VD23 | VD29 |
| VD3  | VD9  | VD15 | VD21 | VD27 |
| VD1  | VD7  | VD13 | VD19 | VD25 |
| VD31 | VD5  | VD11 | VD17 | VD23 |
| VD29 | VD3  | VD9  | VD15 | VD21 |
| VD27 | VD1  | VD7  | VD13 | VD19 |
| VD25 | VD31 | VD5  | VD11 | VD17 |
| VD23 | VD29 | VD3  | VD9  | VD15 |
| VD21 | VD27 | VD1  | VD7  | VD13 |
| VD19 | VD25 | VD31 | VD5  | VD11 |
| VD17 | VD23 | VD29 | VD3  | VD9  |
| VD15 | VD21 | VD27 | VD1  | VD7  |

FIG. 17

| (ODD) | (EVEN) | (ODD) | (EVEN) | (ODD) |
|-------|--------|-------|--------|-------|
| VD31 | VD6 | VD11 | VD18 | VD23 |
| VD29 | VD4 | VD9 | VD16 | VD21 |
| VD27 | VD2 | VD7 | VD14 | VD19 |
| VD25 | VD32 | VD5 | VD12 | VD17 |
| VD23 | VD30 | VD3 | VD10 | VD15 |
| VD21 | VD28 | VD1 | VD8 | VD13 |
| VD19 | VD26 | VD31 | VD6 | VD11 |
| VD17 | VD24 | VD29 | VD4 | VD9 |
| VD15 | VD22 | VD27 | VD2 | VD7 |
| VD13 | VD20 | VD25 | VD32 | VD5 |
| VD11 | VD18 | VD23 | VD30 | VD3 |
| VD9 | VD16 | VD21 | VD28 | VD1 |
| VD7 | VD14 | VD19 | VD26 | VD31 |
| VD5 | VD12 | VD17 | VD24 | VD29 |
| VD3 | VD10 | VD15 | VD22 | VD27 |
| VD1 | VD8 | VD13 | VD20 | VD25 |
| VD31 | VD6 | VD11 | VD18 | VD23 |
| VD29 | VD4 | VD9 | VD16 | VD21 |
| VD27 | VD2 | VD7 | VD14 | VD19 |
| VD25 | VD32 | VD5 | VD12 | VD17 |
| VD23 | VD30 | VD3 | VD10 | VD15 |
| VD21 | VD28 | VD1 | VD8 | VD13 |
| VD19 | VD26 | VD31 | VD6 | VD11 |
| VD17 | VD24 | VD29 | VD4 | VD9 |
| VD15 | VD22 | VD27 | VD2 | VD7 |

FIG. 20

| | | | | |
|---|---|---|---|---|
| VD19.5 | VD13 | VD14.5 | VD16 | VD17.5 |
| VD19 | VD12.5 | VD14 | VD15.5 | VD17 |
| VD18.5 | VD12 | VD13.5 | VD15 | VD16.5 |
| VD18 | VD19.5 | VD13 | VD14.5 | VD16 |
| VD17.5 | VD19 | VD12.5 | VD14 | VD15.5 |
| VD17 | VD18.5 | VD12 | VD13.5 | VD15 |
| VD16.5 | VD18 | VD19.5 | VD13 | VD14.5 |
| VD16 | VD17.5 | VD19 | VD12.5 | VD14 |
| VD15.5 | VD17 | VD18.5 | VD12 | VD13.5 |
| VD15 | VD16.5 | VD18 | VD19.5 | VD13 |
| VD14.5 | VD16 | VD17.5 | VD19 | VD12.5 |
| VD14 | VD15.5 | VD17 | VD18.5 | VD12 |
| VD13.5 | VD15 | VD16.5 | VD18 | VD19.5 |
| VD13 | VD14.5 | VD16 | VD17.5 | VD19 |
| VD12.5 | VD14 | VD15.5 | VD17 | VD18.5 |
| VD12 | VD13.5 | VD15 | VD16.5 | VD18 |
| VD19.5 | VD13 | VD14.5 | VD16 | VD17.5 |
| VD19 | VD12.5 | VD14 | VD15.5 | VD17 |
| VD18.5 | VD12 | VD13.5 | VD15 | VD16.5 |
| VD18 | VD19.5 | VD13 | VD14.5 | VD16 |
| VD17.5 | VD19 | VD12.5 | VD14 | VD15.5 |
| VD17 | VD18.5 | VD12 | VD13.5 | VD15 |
| VD16.5 | VD18 | VD19.5 | VD13 | VD14.5 |
| VD16 | VD17.5 | VD19 | VD12.5 | VD14 |
| VD15.5 | VD17 | VD18.5 | VD12 | VD13.5 |

FIG. 22

| | | | | |
|------|------|------|------|------|
| VD19 | VD13 | VD14 | VD16 | VD17 |
| VD19 | VD12 | VD14 | VD15 | VD17 |
| VD18 | VD12 | VD13 | VD15 | VD16 |
| VD18 | VD19 | VD13 | VD14 | VD16 |
| VD17 | VD19 | VD12 | VD14 | VD15 |
| VD17 | VD18 | VD12 | VD13 | VD15 |
| VD16 | VD18 | VD19 | VD13 | VD14 |
| VD16 | VD17 | VD19 | VD12 | VD14 |
| VD15 | VD17 | VD18 | VD12 | VD13 |
| VD15 | VD16 | VD18 | VD19 | VD13 |
| VD14 | VD16 | VD17 | VD19 | VD12 |
| VD14 | VD15 | VD17 | VD18 | VD12 |
| VD13 | VD15 | VD16 | VD18 | VD19 |
| VD13 | VD14 | VD16 | VD17 | VD19 |
| VD12 | VD14 | VD15 | VD17 | VD18 |
| VD12 | VD13 | VD15 | VD16 | VD18 |
| VD19 | VD13 | VD14 | VD16 | VD17 |
| VD19 | VD12 | VD14 | VD15 | VD17 |
| VD18 | VD12 | VD13 | VD15 | VD16 |
| VD18 | VD19 | VD13 | VD14 | VD16 |
| VD17 | VD19 | VD12 | VD14 | VD15 |
| VD17 | VD18 | VD12 | VD13 | VD15 |
| VD16 | VD18 | VD19 | VD13 | VD14 |
| VD16 | VD17 | VD19 | VD12 | VD14 |
| VD15 | VD17 | VD18 | VD12 | VD13 |

DISPLAY DEVICE AND METHOD FOR PROVIDING STEREOSCOPIC IMAGE THE SAME

CROSS-REFERENCE TO RELATED APPLICATION

This application claims priority under 35 USC § 119 from Korean Patent Application No. 10-2022-0072558, filed on Jun. 15, 2022 in the Korean Intellectual Property Office, the contents of which are herein incorporated by reference in their entirety.

TECHNICAL FIELD

Embodiments of disclosure are directed to a display device and a method for providing a stereoscopic image on the display device.

DISCUSSION OF THE RELATED ART

Recently, a stereoscopic image display device and a viewing angle control display device that divide and display an image of a display device in a space in front of the display device using an optical member have been developed.

A stereoscopic image display device separates and displays a left-eye image and a right-eye image to create a three-dimensional effect using binocular parallax. Stereoscopic image display devices includes those that use a stereoscopic technique and those that use an auto stereoscopic technique. The stereoscopic technique uses parallax images of the left and right eyes with a stereoscopic effect, and includes a glasses method and a glasses-free method, both of which are being put to practical use. The glasses method displays the left and right parallax images by changing polarization, and implements a stereoscopic image using polarized glasses or shutter glasses.

The glasses-free method implements a stereoscopic image by using an optical member such as a parallax barrier or a lenticular sheet in the display device and separating optical axes of the left and right parallax images. Such a stereoscopic image display device can be manufactured by using a bonding device that bonds the display panel and the optical member.

SUMMARY

Embodiments of the disclosure provide a display device that displays an image with various viewing angles of an object at the same display viewing angle determined by a lens of a display panel, and a method for providing a stereoscopic image of the same.

According to an embodiment of the disclosure, a method for providing a stereoscopic image of a display device includes receiving, by a display panel that includes first to N-th sub-pixels, wherein N is a positive integer that is greater than or equal to 2, first to M-th view input data corresponding to first to M-th view images, wherein M is a positive integer that satisfies M>N, allocating the first to M-th view input data to the first to N-th sub-pixels as corresponding first to N-th view image data in a first mode, and displaying, by plurality of lenses disposed on the display panel, a light field image in the first to N-th sub-pixels according to the first to N-th view image data.

In an embodiment, when allocating the first to M-th view input data to the first to N-th sub-pixels as the corresponding first to N-th view image data, one K-th view input data of the first to M-th view input data is not allocated to K-th sub-pixels as K-th corresponding view image data, where K is a natural number that satisfies 1<K<N.

In an embodiment, each of the first to N-th sub-pixels receives one image data of the first to N-th view image data.

In an embodiment, each of the first to N-th sub-pixels outputs one view image of the first to M-th view images.

In an embodiment, one S-th view image, wherein S is a positive integer that satisfies 1<S<N, of the first to N-th view images is output to an S-th view area of the first to N-th view areas.

In an embodiment, allocating the first to M-th view input data to the first to N-th sub-pixels as the corresponding first to N-th view image data in the first mode includes receiving the first to M-th view input data and allocating K to K+N−1-th view image data.

In an embodiment, the method further comprises, when first to 2N-th view input data are received, allocating 1+[N/2]-th to N+[N/2]-th view image data, and generating a first light field image based on the 1+[N/2]-th to N+[N/2]-th view image data.

In an embodiment, the method further comprises outputting the first light field image to each of the first to N-th sub-pixels, wherein the first to N-th sub-pixels outputs an image of the 1+[N/2]-th to N+[N/2]-th view image data, respectively.

In an embodiment, the method further comprises receiving the first to M-th view input data that correspond to the first to M-th view images, wherein M is a positive integer that satisfies M>N, allocating the first to M-th view input data to the first to N-th sub-pixels as the corresponding first to N-th view image data in a second mode, and when first to 2N-th view input data are received in the second mode, allocating a corresponding 2L−1 view image data to an L-th sub-pixels, wherein L is a positive integer that satisfies L<N.

In an embodiment, the method further comprises generating a second light field image based on first to 2N−1-th view image data.

In an embodiment, the method further comprises outputting the second light field image to each of the first to N-th sub-pixels, wherein the first to N-th sub-pixels may output the first to 2N−1-th view image data, respectively.

In an embodiment, the method further comprises receiving the first to M-th view input data that correspond to the first to M-th view images, wherein M is a positive integer that satisfies M>N, allocating the first to M-th view input data to the first to N-th sub-pixels as the corresponding first to N-th view image data in a second mode, and, when in the second mode, allocating view image data that correspond to a gradation value that correspond to an average brightness of corresponding 2L view input data and 2L−1 view input data to one L-th sub-pixels, wherein L is a positive integer that satisfies L<N, of the first to N-th sub-pixels.

In an embodiment, the method further comprises receiving the first to M-th view input data that correspond to the first to M-th view images, wherein M is a positive integer that satisfies M>N, allocating the first to M-th view input data to the first to N-th sub-pixels as the corresponding first to N-th view image data in a third mode, and when first to 2N view image data are received in the third mode, allocating a corresponding (P−1)/2+[3N/4]-th view image data to one P sub-pixels, wherein P is a positive integer that satisfies P<N, of the first to N-th sub-pixels.

In an embodiment, the method further comprises generating a third light field image based on [3N/4]-th view image data to (N−2)/2+[3N/4]-th view image data.

In an embodiment, the method further comprises outputting the third light field image to each of the first to N-th sub-pixels, wherein the first to N-th sub-pixels may output an image of the [3N/4]-th to (N−2)/2+[3N/4]-th view image data, respectively.

In an embodiment, the same view input data is allocated to each of an Rth sub-pixel and an R+1-th sub-pixel of the first to N-th sub-pixels, wherein R is a positive integer that satisfies R<N.

According to another embodiment of the disclosure, a display device comprises a display panel that includes first to N-th sub-pixels to which first to N-th view images are allocated, wherein N is a positive integer that satisfies N≥2, a plurality of lenses disposed on the display panel and that project the first to N-th view images in first to N-th view areas, respectively, and a control unit that receives first to M-th view input data that correspond to first to M-th view images, wherein M is a positive integer that satisfies M>N, and allocates the first to M-th view input data to the first to N-th sub-pixels as corresponding first to N-th view image data in a first mode.

In an embodiment, the control unit generates a light field image based on the first to N-th view image data.

In an embodiment, the control unit receives the first to M-th view input data and allocates K-th view to K+N−1-th view image data in the first mode.

In an embodiment, the control unit allocates the same view input data to each of an Rth sub-pixel and an R+1-th sub-pixel of the first to N-th sub-pixels, wherein R is a positive integer that satisfies R<N.

According to embodiments, a display device is provided that can provide an image that has various viewing angles of an object at the same display viewing angle determined by a lens of a display panel, and a method for providing a stereoscopic image of the same, by mapping image data according to a mode of the display device.

BRIEF DESCRIPTION OF THE DRAWINGS

FIG. 6 is a block diagram of a stereoscopic image display device, according to an embodiment.

FIG. 8 illustrates a pixel array when 16 sub-pixels are used, according to an embodiment.

FIG. 10 illustrates a first view map when 16 sub-pixels are used, according to an embodiment.

FIG. 13 illustrates a second view map when 16 sub-pixels are used, according to an embodiment.

FIG. 15 illustrates a second view map when 16 sub-pixels are used, according to an embodiment.

FIG. 17 illustrates a second view map when 16 sub-pixels are used, according to an embodiment.

FIG. 20 illustrates a third view map when 16 sub-pixels are used, according to an embodiment.

FIG. 22 illustrates a third view map when 16 sub-pixels are used, according to an embodiment.

DETAILED DESCRIPTION

Embodiments of the disclosure will now be described more fully hereinafter with reference to the accompanying drawings, in which embodiments of the disclosure are shown.

It will also be understood that when a layer is referred to as being "on" another layer or substrate, it can be directly on the other layer or substrate, or intervening layers may also be present. The same reference numbers may indicate the same components throughout the specification.

Hereinafter, specific embodiments will be described with reference to the accompanying drawings.

Figure 1:
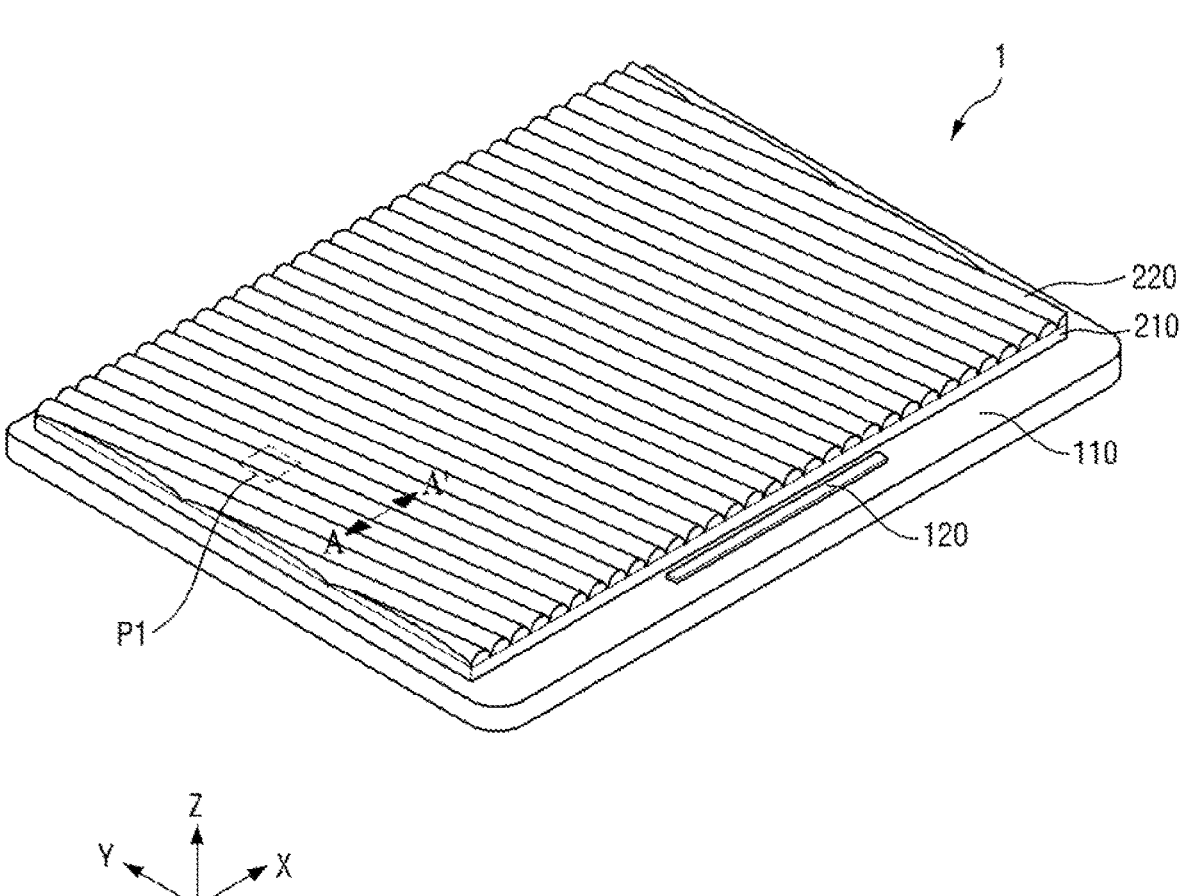
FIG. 1 is a perspective view of a stereoscopic image display device, according to an embodiment.
Figure 2:
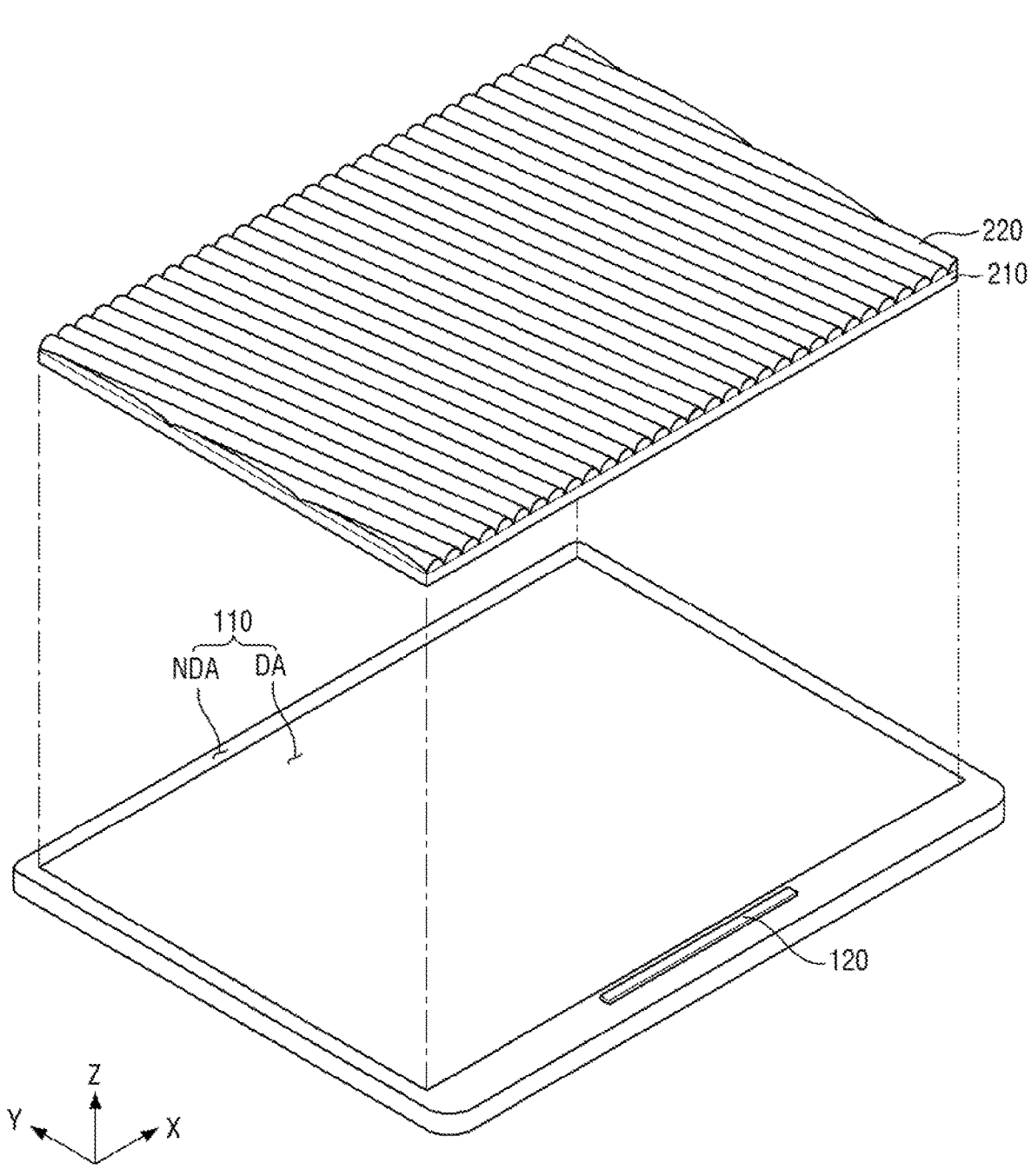
FIG. 2 is an exploded perspective view of a stereoscopic image display device, according to an embodiment.

FIG. 1 is a perspective view of a display device 1 according to an embodiment. FIG. 2 is an exploded perspective view of the display device 1 according to an embodiment.

Hereinafter, a first direction X, a second direction Y, and a third direction Z intersect each other in different directions. According to an embodiment, the first direction X is a horizontal direction, the second direction Y is a vertical direction, and the third direction Z is a thickness direction. The first direction X, the second direction Y, and/or the third direction Z include two or more directions. For example, the third direction Z includes an upper direction toward an upper side of the drawing and a lower direction toward a lower side of the drawing. For example, one surface of the display device that faces the upper direction can be referred to as an upper surface, and the other surface of the display device that faces the lower direction can be referred to as a lower surface. However, the directions are illustrative and relative, and are not necessarily limited thereto.

The display device 1 is a stereoscopic image display device. The stereoscopic image display device separates and displays a left-eye image and a right-eye image in a space in front of the display device 1 to create a three-dimensional effect due to binocular parallax. Further, the stereoscopic image display device separates and provides a plurality of viewing angle images in the space in front of the display device 1 to display different images that correspond to a plurality of different viewing angles. For example, the stereoscopic image display device 1 displays different image information to each eye of a viewer by arranging a member, such as a barrier or a lenticular lens LS, on a display panel 110.

Specifically, the display device 1 provides image information by dividing an image displayed on the display panel 110 in the space in front of the display device 1 using a lens LS. By properly utilizing this image information transmitting method, the display device 1 can be utilized as a stereoscopic image display device that provides a three-dimensional image or a viewing angle control display device that displays different images to users located at different viewing angles. Accordingly, stereoscopic image information that corresponds to specific directions can be provided to a viewer. For example, the display device 1 may be a light field display device that provides different image information for each location, but is not necessarily limited thereto.

Referring to FIGS. 1 and 2, in an embodiment, the display device 1 includes a display panel 110, a display driver 120, a circuit board, a base member 210, and three-dimensional lenses 220.

In an embodiment, the display panel 110 is a light emitting display panel 110 that includes a light emitting element. For example, the display panel 110 may be one of an organic light emitting display panel that uses an organic light emitting diode that includes an organic light emitting layer, a micro light emitting diode (LED) display panel that uses a micro LED, a quantum dot light emitting display panel that uses a quantum dot light emitting diode that includes a quantum dot light emitting layer, or an inorganic light emitting display panel that uses an inorganic light emitting element that includes an inorganic semiconductor, but is not necessarily limited thereto.

The display panel 110 has a rectangular shape in a plan view. The display panel 110 has long sides in the first direction X and short sides in the second direction Y. A corner where the long side in the first direction X and the short side in the second direction Y meet may be rounded with a predetermined curvature, or may have a right angle. The planar shape of the display panel 110 is not necessarily limited to a rectangle, and may be one of other shapes, such as a polygon, a circle, or an oval.

The display panel 110 includes a display area DA and a non-display area NDA around the display area DA.

The display area DA is where an image is displayed, and the non-display area NDA is where no image is displayed. The display area DA includes a plurality of pixels (PX in FIG. 3) disposed thereon, and no pixels are disposed on the non-display area NDA.

The non-display area NDA is disposed around the display area DA and surrounds at least a portion of the display area DA. For example, the display area DA has an approximately rectangular shape in a plan view, and the non-display area NDA has a band shape that surrounds four side edges of the display area DA. However, the non-display area NDA is not necessarily limited thereto, and may surround only a portion of the display area DA.

The display driver 120 outputs signals and voltages that drive the display panel 110. The display driver 120 supplies data voltages to data lines. The display driver 120 supplies a power voltage to a power supply line and supplies scan control signals to a scan driver. For example, the display driver 120 is an integrated circuit (IC) and is disposed in the non-display area (NDA) of the display panel 110 in one of a chip on glass (COG) manner, a chip on plastic (COP) manner, or an ultrasonic bonding manner. For example, the display driver 120 is mounted on a circuit board and connected to pads of the display panel 110.

The base member 210 is disposed on an upper surface of the display panel 110. The upper surface of the display panel 110 is positioned in a direction in which an image is displayed, and a lower surface of the display panel 110 is opposite to the upper surface. The upper and lower surfaces of the display panel 110 also refer to the front and rear surfaces of the display panel 110, respectively.

The base member 210 is configured as a thin film-type member. The base member 210 is disposed on the display area DA and the non-display area NDA of the display panel 110. However, the base member 210 is not necessarily limited thereto, and may be disposed only in the display area DA.

The three-dimensional lenses 220 are disposed on an upper surface of the base member 210. The three-dimensional lenses 220 cover at least a portion of the upper surface of the base member 210. The three-dimensional lenses 220 are disposed in the display area DA and the non-display area NDA. However, the three-dimensional lenses 220 are not necessarily limited thereto, and may be disposed only in the display area DA.

Figure 4:
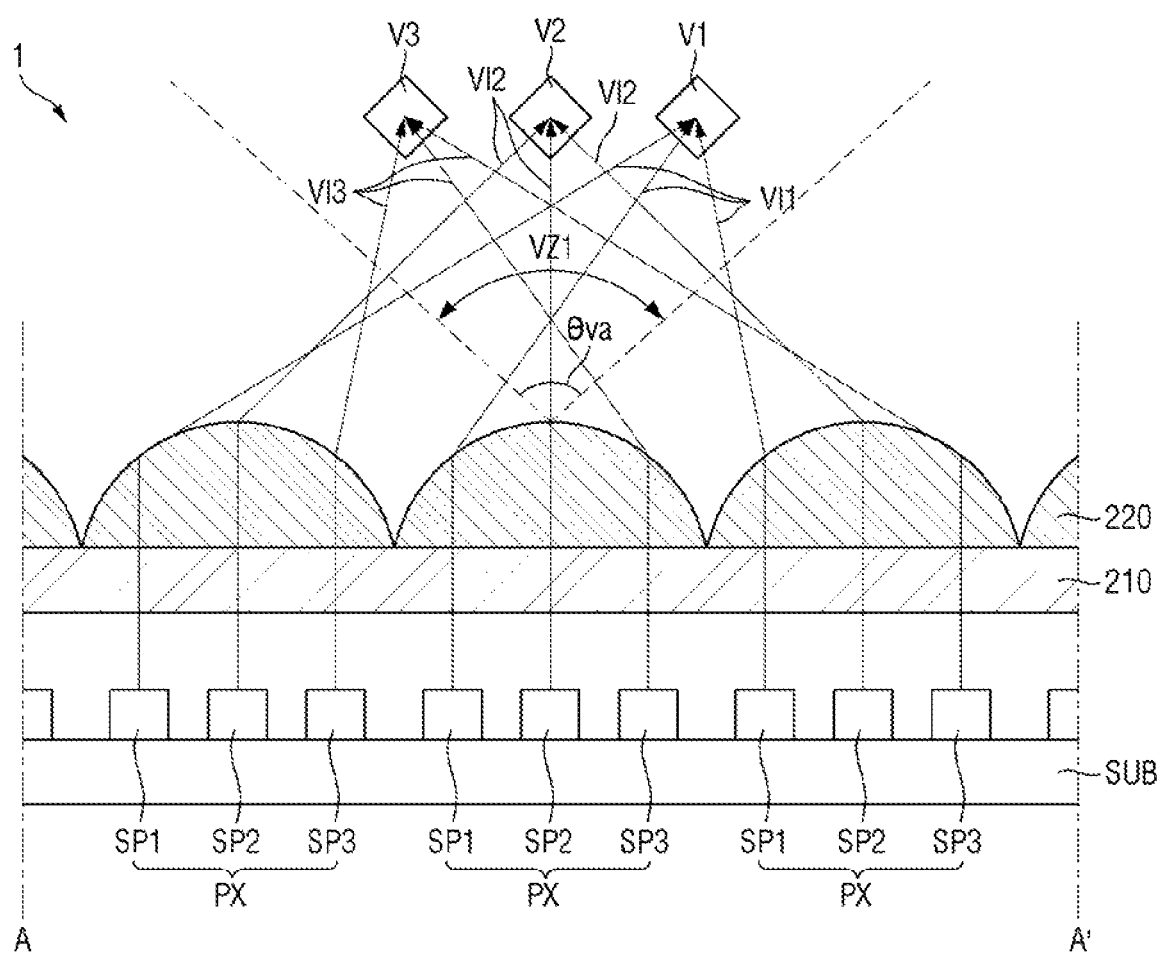
FIG. 4 is a cross-sectional view taken along line A-A' of FIG. 1, according to an embodiment.
Figure 4:
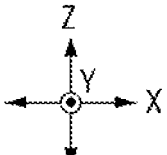

The three-dimensional lenses 220 are arranged at regular intervals and form an array of lenses (LS in FIG. 4). The three-dimensional lenses 220 are slanted and extend in a direction inclined with respect to the first direction X and the second direction Y in a plan view, but are not necessarily limited thereto. In an embodiment, the three-dimensional lenses 220 extend to be parallel to one of the first direction X or the second direction Y.

Each of the three-dimensional lenses 220 is a lenticular lens that has a substantially semi-cylindrical cross-sectional shape or a lenticular lens array film. In an embodiment, the three-dimensional lenses 220 includes a Fresnel lens.

In addition, the display device 1 further includes a coupling member. The coupling member is interposed between the display panel 110 and the base member 210 and bonds the display panel 110 and the base member 210. The coupling member is optically transparent. For example, the coupling member includes an optically transparent adhesive or an optically transparent resin.

Figure 3:
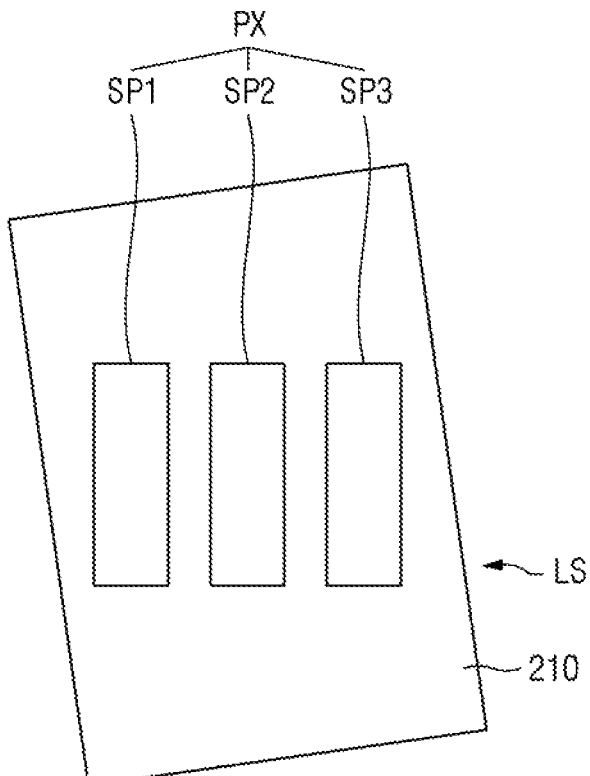
FIG. 3 is an enlarged plan view of portion 'P1' of FIG. 1, according to an embodiment.
Figure 3:
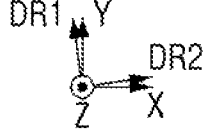
Figure 5:
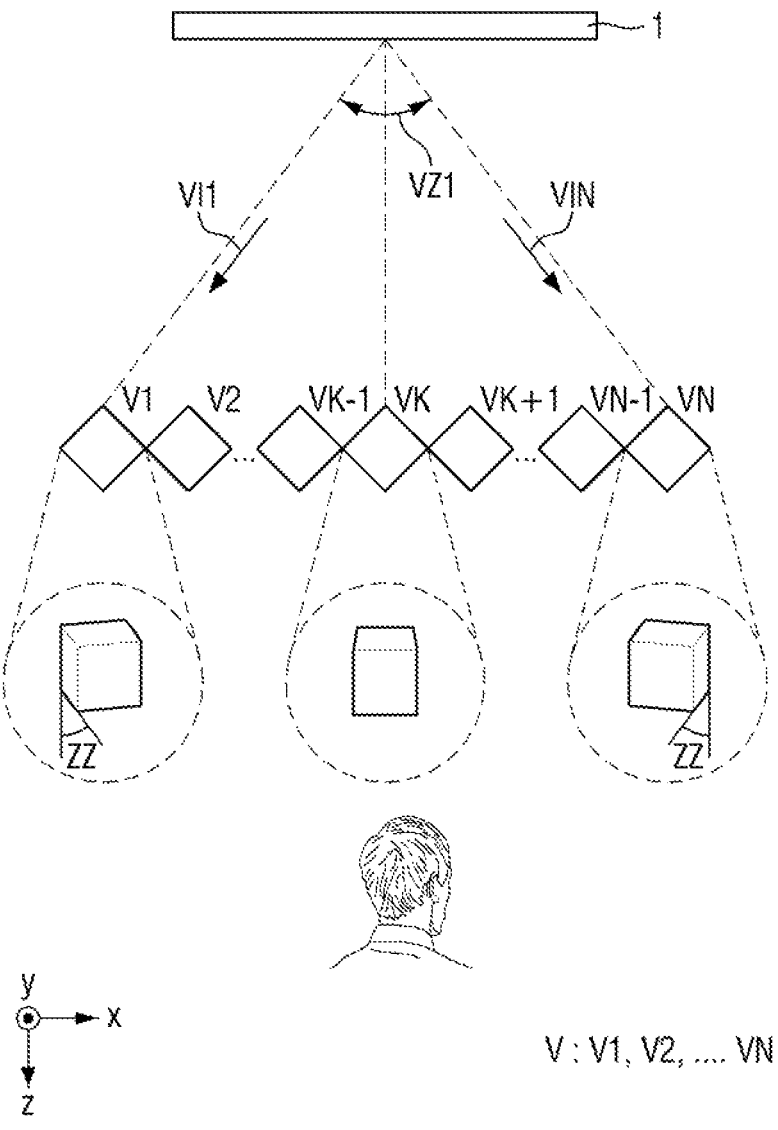
FIG. 5 illustrates a method for displaying a stereoscopic image, according to an embodiment.

FIG. 3 is an enlarged plan view of portion 'P1' of FIG. 1. FIG. 4 is a cross-sectional view taken along line A-A' of FIG. 1. FIG. 5 illustrates a method for displaying a stereoscopic image according to an embodiment.

FIG. 3 conceptually illustrates an arrangement of the three-dimensional lenses 220 and the plurality of pixels PX, and FIG. 4 conceptually illustrates a method of implementing a stereoscopic image and viewing angle control of the display device 1. For convenience of explanation, FIG. 3 illustrates only three pixels PX and one lens LS of the display panel 110, and FIG. 4 illustrates only three pixels PX and three lenses LS of the display panel 110, but the number of pixels PX and lenses LS is not limited thereto.

Referring to FIGS. 3 and 4, in an embodiment, the display panel 110 further includes a substrate SUB.

The substrate SUB includes an organic polymer material such as at least one of polyethylene, polyimide, polycarbonate, polysulfone, polyacrylate, polystyrene, polyvinylchloride, polyvinylalcohol, polynorbornene, or polyester. In addition, the display panel 110 further includes another substrate disposed between the base member 210 and the plurality of pixels PX.

A plurality of pixels PX are disposed on an upper surface of the substrate SUB. Each of the plurality of pixels PX includes a plurality of sub-pixels SP.

The pixel PX is a group of sub-pixels SP that express a white gradation. Each of the sub-pixels SP is a minimum unit that expresses a gradation.

As illustrated in FIGS. 3 and 4, three sub-pixels SP overlap one lens LS in the thickness direction in a cross sectional view, but embodiments of the disclosure are not necessarily limited thereto. The number of sub-pixels SP that overlap one lens LS varies depending on a design of the display device 1, such as the number of view areas V1, V2, and V3. In addition, although FIG. 3 shows that the plurality of sub-pixels SP do not overlap boundaries of the three-dimensional lenses 220, in an embodiment, the sub-pixels SP adjacent to the boundaries of the three-dimensional lenses 220 overlap the boundaries of the three-dimensional lenses 220.

The plurality of sub-pixels SP include first sub-pixels SP1, second sub-pixels SP2, and third sub-pixels SP3.

The first sub-pixels SP1 emit light of a first color, the second sub-pixels SP2 emit light of a second color, and the third sub-pixels SP3 emit light of a third color. In an embodiment, the first color is red, the second color is green, and the third color is blue, but embodiments are not necessarily limited thereto.

Each of the first sub-pixels SP1, the second sub-pixels SP2, and the third sub-pixels SP3 has a rectangular planar shape that has short sides in the first direction X and long sides in the second direction Y. However, embodiments of the disclosure are not necessarily limited thereto, and in other embodiments, each of the first sub-pixels SP1, the second sub-pixels SP2, and the third sub-pixels SP3 may have various other shapes, such as a square, a rhombus, a circle, or an oval, in a plan view.

The first sub-pixels SP1, the second sub-pixels SP2, and the third sub-pixels SP3 are arranged in the first direction X in a plan view. The first sub-pixels SP1, the second sub-pixels SP2, and the third sub-pixels SP3 are repeatedly arranged in that order, but embodiments of the disclosure are not necessarily limited thereto.

As illustrated in FIG. 4, the first sub-pixels SP1, the second sub-pixels SP2, and the third sub-pixels SP3 are arranged in a direction perpendicular to an extension direction of the three-dimensional lenses 220, and/or in a direction inclined to the extension direction of the three-dimensional lenses 220. However, embodiments of the disclosure are not necessarily limited thereto, and in other embodiments, the first sub-pixels SP1, the second sub-pixels SP2, and the third sub-pixels SP3 are arranged in a direction in which the three-dimensional lenses 220 extend and/or in a direction perpendicular to or parallel to the boundaries of the three-dimensional lenses 220.

The first sub-pixels SP1 are adjacent to a first side of each lens LS, such as a left side in FIGS. 3 and 4, the second sub-pixels SP2 are disposed at the center of each lens LS, and the third sub-pixels SP3 are adjacent to a second side of each lens LS, such as a right side in FIGS. 3 and 4.

Referring to FIG. 4, the first sub-pixels SP1, the second sub-pixels SP2, and the third sub-pixels SP3 provide a first view image VI1, a second view image VI2, and a third view image VI3, respectively. The first view image VI1, the second view image VI2, and the third view image VI3 constitute at least a portion of a light field image to be described below. In addition, the first view image VI1, the second view image VI2, and the third view image VI3 are generated in consideration of binocular parallax. This will be described below with reference to FIG. 6.

The first view image VI1 displayed by the first sub-pixels SP1, the second view image VI2 displayed by the second sub-pixels SP2, and the third view image VI3 displayed by the third sub-pixels SP3 are displayed in separate spaces in front of the display device 1. The first view image VI1, the second view image VI2, and the third view image VI3 are refracted by the lens LS and projected to a first view area V1, a second view area V2, and a third view area V3 of the display device 1, respectively. The view areas are viewpoints provided by the display device 1. For example, as illustrated in FIG. 4, the second view area V2 is positioned at a central area of the display device 1, the first view area V1 is positioned in a right area of the display device 1, and the third view area V3 is positioned in a left area of the display device 1.

When the user's left eye and right eye are focused on different view areas of the first view area V1, the second view area V2, and the third view area V3, the user experiences a three-dimensional effect due to binocular parallax. In this case, the display device 1 includes a display viewing angle VZ1. The display viewing angle VZ1 refers to an area in which the user naturally views one stereoscopic image without interruption within the range of a specific viewing angle θva. The first view area V1, the second view area V2, and the third view area V3 constitute at least a portion of a plurality of viewpoints within the display viewing angle VZ1.

In addition, although FIG. 4 shows, for convenience of explanation, that three view images VI1, VI2, and VI3 are projected to three view areas V1, V2, and V3 by the first sub-pixels SP1, the second sub-pixels SP2, and the third sub-pixels SP3, embodiments of the disclosure are not necessarily limited thereto. For example, in an embodiment, the display device 1 further includes a plurality of sub-pixels SP1, SP2, and SP3 that project additional view images, viewpoints, and/or viewing zones in addition to the view images VI1, VI2, and VI3, the view areas V1, V2, and V3, and the display viewing angles VZ1 that are illustrated in FIG. 4. For example, the number of the sub-pixels SP1, SP2, and SP3, the view images VI1, VI2, and VI3, the view areas V1, V2, and V3, and the display viewing angles VZ1 varies according to the design of the display device 1.

For example, FIG. 5 illustrates an example that includes N sub-pixels and an object viewing angle ZZ.

Referring to FIG. 5, in an embodiment, first sub-pixels to N-th sub-pixels project a first view image VI1 to an N-th view image VIN, respectively. The first view image VI1 to the N-th view image VIN constitute at least a portion of a light field image to be described below. In addition, the first view image VI1 to the N-th view image VIN are generated in consideration of binocular parallax. However, embodiments of the disclosure are not necessarily limited thereto, and in other embodiments, each of the first sub-pixels to the N-th sub-pixels projects an arbitrary view image. This will be described below with reference to FIGS. 7 to 11.

The first view image VI1 to the N-th view image VIN are displayed in spaces in front of the display device 1 that are separated from each other. The first view image V1 to the N-th view image VIN are refracted by the lens LS and projected to a first view area V1 to an N-th view area VN of the display device 1, respectively. The view areas are viewpoints provided by the display device 1. For example, the K-th view area VK is positioned in a central area of the display device 1, the first view area V1 is positioned in a right area of the display device 1, and the N-th view area VN is positioned in a left area of the display device 1.

When the user's left eye and right eye are focused on different view areas of the first view area V1 to the N-th view area VN, the user experiences a three-dimensional effect due to binocular parallax. For example, one image includes an object viewing angle ZZ that can produce the three-dimensional effect. The object viewing angle ZZ is a maximum angle at which an object naturally produces a three-dimensional effect in one object of an image. That is, an axis in a projection direction of an image from the display panel is defined as a reference axis, and a maximum angle from the reference axis at which an object can be three-dimensionally displayed is defined as the object viewing angle ZZ. Accordingly, the user experiences the three-dimensional effect of the image within the object viewing angle ZZ.

Figure 6:
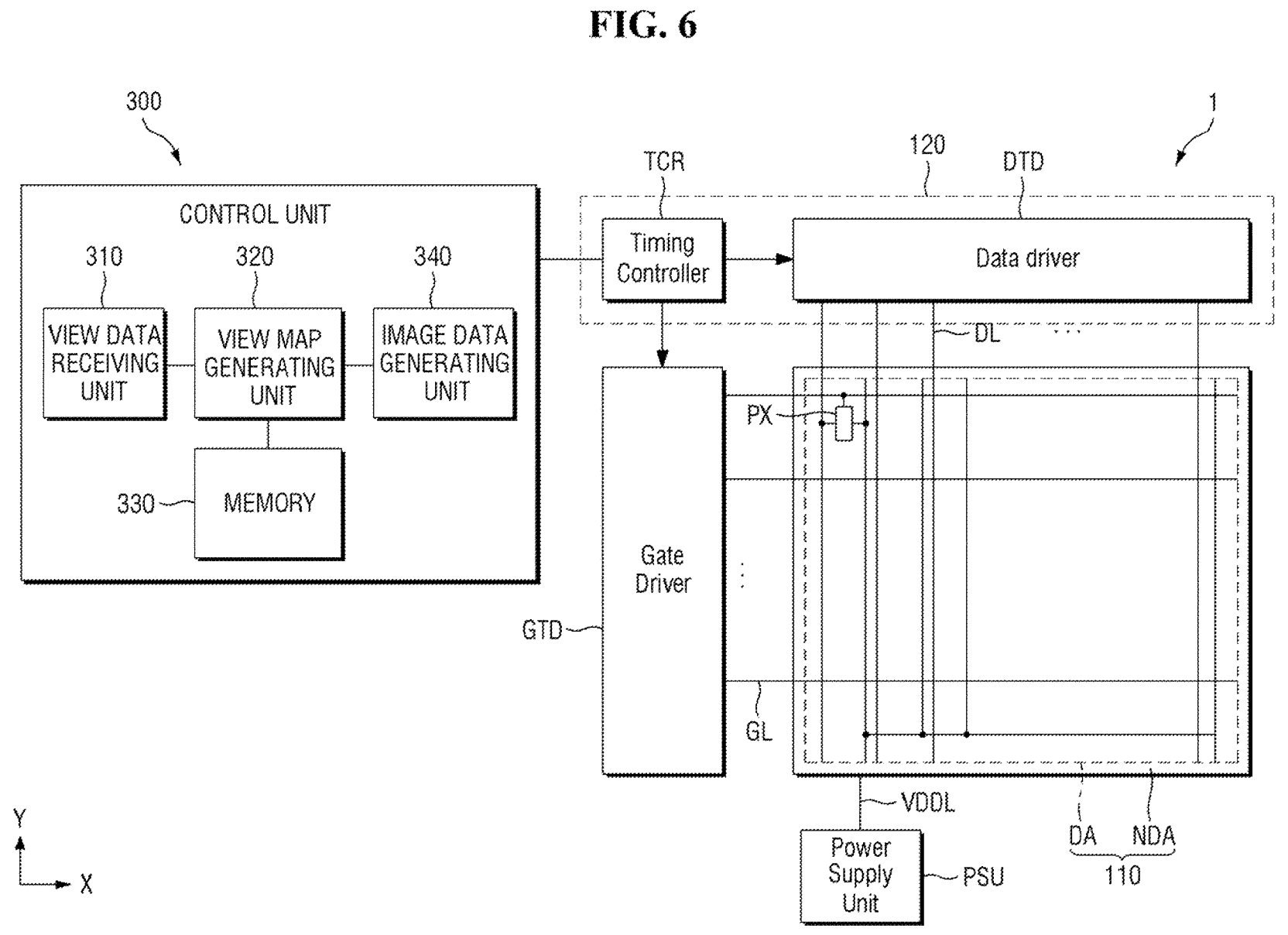

FIG. 6 is a block diagram of a stereoscopic image display device according to an embodiment.

Referring to FIG. 6, in an embodiment, the display device 1 further includes a plurality of data lines DL, a plurality of gate lines GL, a control unit 300, a timing controller TCR, a data driver DTD, a gate driver GTD, and a power supply unit PSU. The timing controller TCR and the data driver DTD are included in the display driver 120.

The plurality of data lines DL are connected between the data driver DTD and the plurality of pixels PX. The plurality of data lines DL supply a data voltage to each of the plurality of pixels PX. The plurality of data lines DL extend in the second direction Y and are spaced apart from each other in the first direction X.

The plurality of gate lines GL are connected between the gate driver GTD and the plurality of pixels PX. The plurality of gate lines GL supply a gate signal to each of the plurality of pixels PX. The plurality of gate lines GL extend in the first direction X and are spaced apart from each other in the second direction Y.

Each of the plurality of pixels PX is disposed in one of a plurality of pixel PX areas where the plurality of data lines DL and the plurality of gate lines GL intersect each other. Each of the plurality of pixels PX is connected to at least one gate line GL, a data line DL, and a driving voltage line VDDL connected to the power supply unit PSU.

The timing controller TCR receives a light field image from the control unit 300. The timing controller TCR generates a data control signal and a gate control signal based on the light field image. The timing controller TCR controls a driving timing of the data driver DTD using the data control signal and controls a driving timing of the gate driver GTD using the gate control signal. The timing controller TCR generates pixel data based on output data generated by the control unit 300, and adjusts the pixel data to be suitable for the arrangement structure of the pixels PX and supplies the pixel data to the data driver DTD.

The data driver DTD receives the pixel data and the data control signal from the timing controller TCR. The data driver DTD generates a data voltage based on the pixel data, and supplies the data voltage to the data line DL according to the data control signal. The data voltage is supplied to the plurality of pixels PX through the data line DL, and determines a luminance of the plurality of pixels PX.

The gate driver GTD is disposed in the non-display area NDA of the display panel 110. The gate driver GTD generates a gate signal based on the gate control signal GCS received from the timing controller TCR, and sequentially supplies the gate signal to the plurality of gate lines GL according to a preset order.

The power supply unit PSU supplies the driving voltage to the display panel 110. The power supply unit PSU generates the driving voltage and supplies the driving voltage to the plurality of pixels PX through a driving voltage line VDDL. The power supply unit PSU also generates a common voltage and supplies the common voltage to a low potential line of the display panel 110. For example, the driving voltage corresponds to a high potential voltage that drives the plurality of pixels PX, and the common voltage corresponds to a low potential voltage commonly supplied to the plurality of pixels PX.

The control unit 300 includes a view data receiving unit 310, a view map generating unit 320, a memory 330, and an image data generating unit 340.

The view data receiving unit 310 receives image data from a user or a host. The view data receiving unit 310 calculates a plurality of view input data based on the received image data. The plurality of view input data includes stereoscopic image information. As described above, the stereoscopic image display device 1 separates and projects a view image to display a different image for each of the different view areas V. For example, each of the plurality of view input data includes information on the view image displayed for each of the different view areas V. The view data receiving unit 310 outputs the plurality of view input data to the view map setting unit 320.

The view map setting unit 320 receives the plurality of view input data from the view data receiving unit 310. The view map setting unit 320 sets a view map based on the plurality of received view input data. For example, each of the plurality of sub-pixels SP projects a different view image that corresponds to each of the sub-pixels SP. For example, the view map is coordinate information of the view image allocated to the sub-pixels SP. For example, when M view input data is received in each of the N sub-pixels SP, where M is a positive integer greater than N, the view map setting unit 320 sets a view map that allocates N of M view input data to each of the N sub-pixels. The view map setting unit 320 outputs the set view map to the image data generating unit 340.

The view map setting unit 320 receives data for setting the view map from the memory 330. To set the view map, the view map setting unit 320 sets the view map to allocate the plurality of view input data based on the data.

The memory 330 stores data that supports various functions of the control unit 300. The memory 330 stores a program that operates the control unit 300, and stores input/output data, such as the plurality of view input data obtained by the view map setting unit 320 and the data for setting the view map.

The image data generating unit 340 receives the view map from the view map setting unit 320. The image data generating unit 340 receives the plurality of view input data and maps the plurality of view input data according to the view map. For example, when the image data generating unit 340 uses N sub-pixels and receives M view input data, the image data generating unit 340 sequentially allocates the N of M view input data to each of the N sub-pixels based on the view map. The image data generating unit 340 generates view image data based on the view input data. In addition, the image data generating unit 340 generates a light field image based on the view Image data. For example, the light field image includes information on the view image displayed for each of the different view areas V. For example, the light field image may include stereoscopic image information. The image data generating unit 340 outputs the light field image to the timing controller TCR. A detailed operation of the control unit 300 will be described below with reference to FIGS. 7 to 11.

Figure 7:
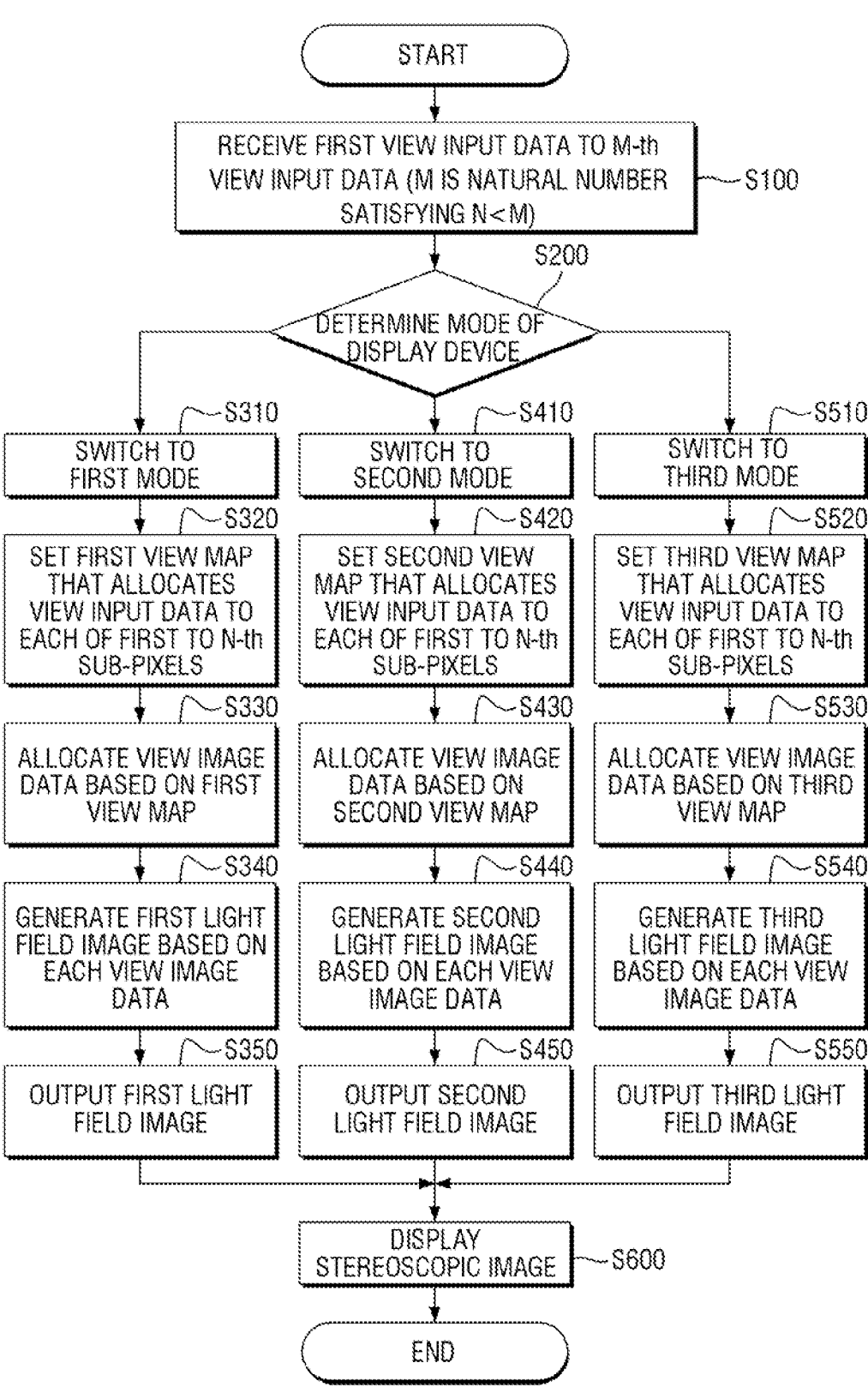
FIG. 7 is a flowchart of a method for displaying a stereoscopic image, according to an embodiment.
Figure 9:
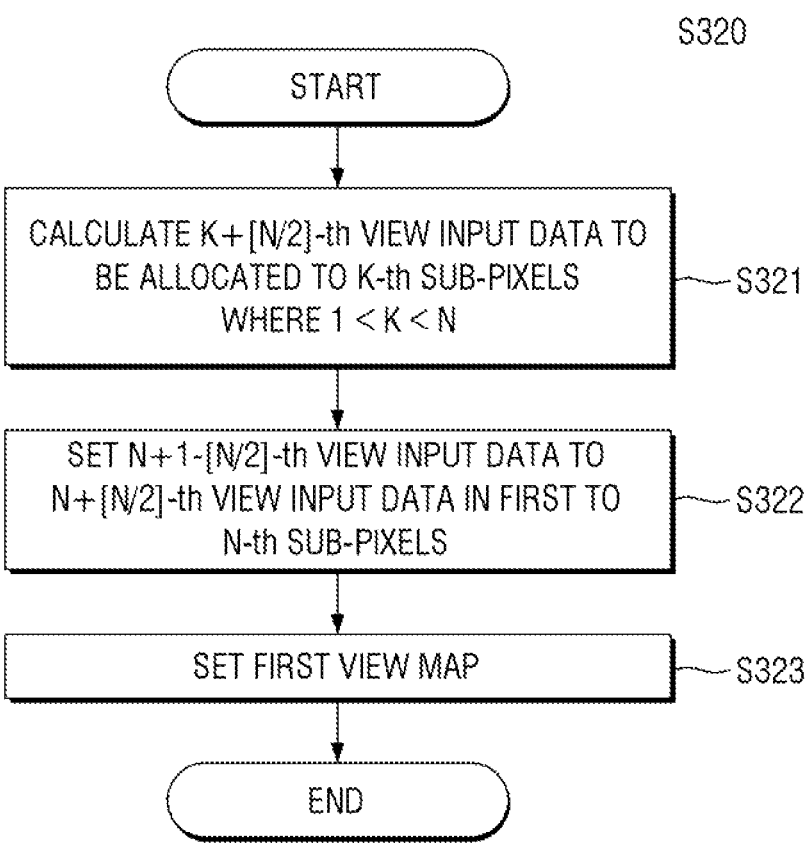
FIG. 9 is a flowchart of a method of setting a view map, according to an embodiment.
Figure 11:
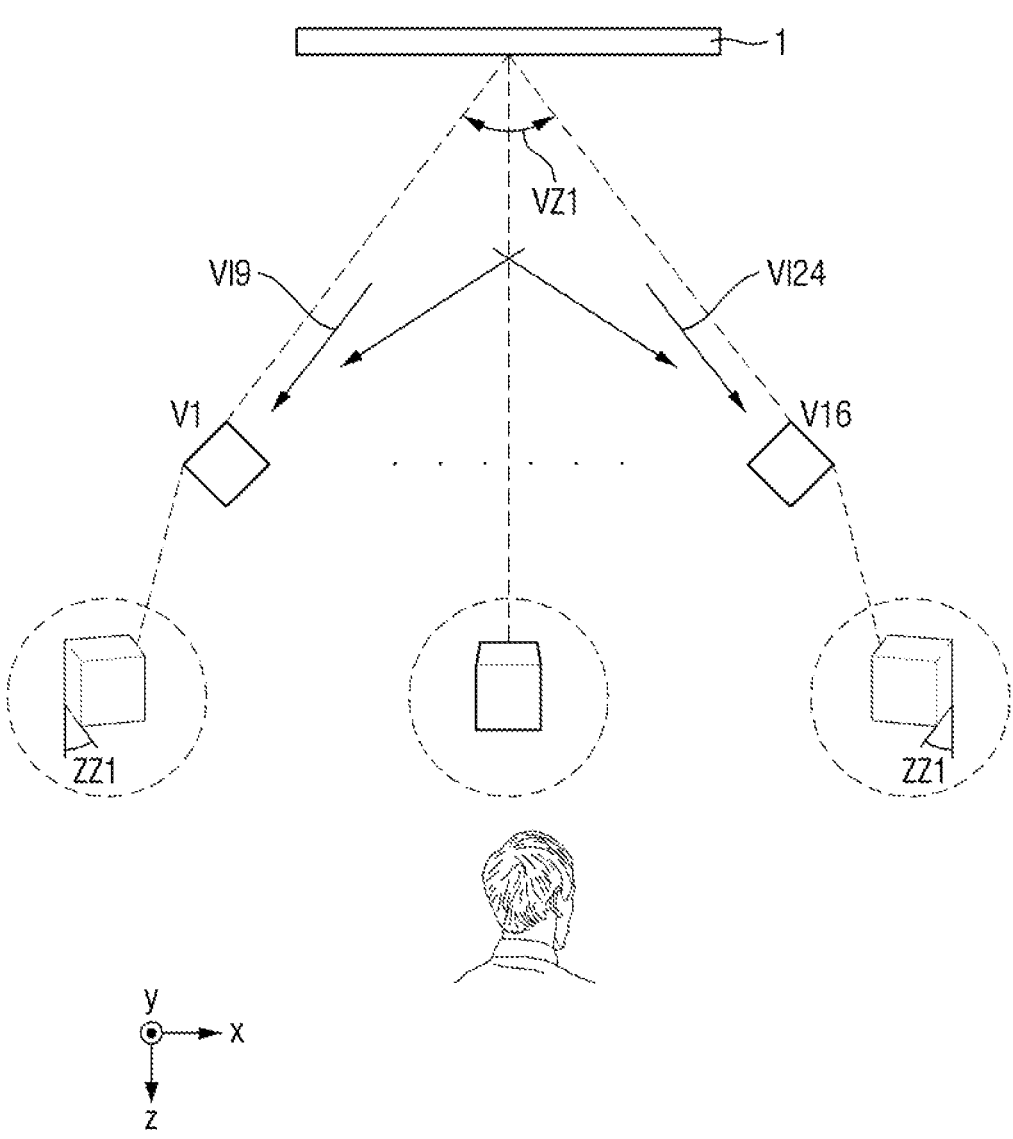
FIG. 11 illustrates a method for displaying a stereoscopic image, according to an embodiment.

FIG. 7 is a flowchart of a method for displaying a stereoscopic image according to an embodiment. FIG. 8 illustrates a pixel array when 16 sub-pixels are used, according to an embodiment. FIG. 9 is a flowchart of a method of setting a view map, according to an embodiment. FIG. 10 is a illustrates a first view map when 16 sub-pixels are used, according to an embodiment. FIG. 11 illustrates a method for displaying a stereoscopic image according to an embodiment.

Hereinafter, a method for displaying a stereoscopic image will be described with reference to FIGS. 7 to 11. FIGS. 8 and 10 illustrate a pixel array when N=16 sub-pixels are used as an example. However, embodiments of the disclosure are not necessarily limited to the number of views and the number of view input data.

Referring to FIG. 7, in an embodiment, first, the control unit 300 receives first view input data VD1 to M-th view input data VDM that includes information on a first view image VI1 to an M-th view image VIM, where M is a positive integer that satisfies N<M (S100). For example, when M equals 2N, the control unit 300 receives first view input data VD1 to VD2N view input data that includes 2N view images. Hereinafter, a case in which M equals 2N will be described, but embodiments of the disclosure are not necessarily limited thereto, and in embodiments, M is a positive integer greater than N.

Referring further to FIG. 8, in an embodiment, when 16 sub-pixels are used, each view image is allocated to each sub-pixel. In the drawing, the number of each view image is the number of the view image that corresponds to each of the sub-pixels. In the tables of FIGS. 8, 10, 13, 15, 17 and 20, each box refers to a sub pixel, a row refers to a row of sub pixels and a column refers to a column of sub pixels. The number of row and the number of columns in the tables are not important. The diagonal line refers to a left side and a right side of the inclined three-dimensional lenses 220. The VDxx of each box refers to a view input data input to each sub pixel, and VS refers to the pixel array. For example, first sub-pixels SP1 output a first view image VI1 to a first view area V1, second sub-pixels SP2 output a second view image VI2 to a second view area V2, third sub-pixels SP3 output a third view image VI3 to a third view area V3, fourth sub-pixels outputs a fourth view image VI4 to a fourth view area, fifth sub-pixels output a fifth view image VI5 to a fifth view area, sixth sub-pixels output a sixth view image VI6 to a sixth view area, seventh sub-pixels output a seventh view image VI7 to a seventh view area, eighth sub-pixels output an eighth view image VI8 to an eighth view area, ninth sub-pixels output a ninth view image VI9 to a ninth view area, tenth sub-pixels output a tenth view image VI10 to a tenth view area, eleventh sub-pixels output an eleventh view image VI11 to an eleventh view area, twelfth sub-pixels output a twelfth view image VI12 to a twelfth view area, thirteenth sub-pixels output a thirteenth view image VI13 to a thirteenth view area, fourteenth sub-pixels output a fourteenth view image VI14 to a fourteenth view area, fifteenth sub-pixels output a fifteenth view image VI15 to a fifteenth view area, and sixteenth sub-pixels output a sixteenth view image VI16 to a sixteenth view area.

In addition, the control unit 300 determines a mode of the display device (S200). For example, the control unit 300 determines one of a first mode, a second mode for outputting a viewing angle of an object greater than the viewing angle of the object in the first mode, and a third mode for outputting a viewing angle of an object smaller than the viewing angle of the object in the first mode. The first mode is a normal 3D mode, the second mode is a low-resolution 3D mode, and the third mode is a high-resolution 3D mode.

When the display device is switched to the first mode (S310), the control unit 300 receives first view input data VD1 to M-th view input data VDM and sets a first view map VM1 that allocates corresponding view input data to each of the first to N-th sub-pixels (S320).

FIG. 9 illustrates an example in which first to 2N-th view input data are received, e.g., when M equals 2N. Referring further to FIG. 9, in an embodiment, the control unit 300 calculates view input data to be allocated to each of the N sub-pixels (S321).

The control unit 300 receives the first to 2N-th view input data and calculates the view input data that corresponds to the first to N-th sub-pixels. For example, for K satisfying 1<K<N, the control unit 300 calculates K+[N/2]-th view input data to be allocated to K-th sub-pixels.

The control unit 300 sequentially sets N+1[N/2]-th view input data to N+[N/2]-th view input data in each of the first to N-th sub-pixels (S322), and sets a first view map VM1 (S323).

For example, the control unit 300 sets the corresponding view input data in the first to N-th sub-pixels. For example, the control unit 300 sets N view input data to the N sub-pixels. For example, the N view input data include the N view input data sequentially from the N+1[N/2]-th view input data of the first view input data VD1 to the 2N view input data. For example, a case in which 16 sub-pixels are used, illustrated in FIG. 10, will be described. The control unit 300 sets the first view map VM1 so that ninth view input data VD9 is allocated to the first sub-pixels, tenth view input data VD10 is allocated to the second sub-pixels, eleventh view input data VD11 is allocated to the third sub-pixels, twelfth view input data VD12 is allocated to the fourth sub-pixels, thirteenth view input data VD13 is allocated to the fifth sub-pixels, fourteenth view input data VD14 is allocated to the sixth sub-pixels, fifteenth view input data VD15 is allocated to the seventh sub-pixels, sixteenth view input data VD16 is allocated to the eighth sub-pixels, seventeenth view input data VD17 is allocated to the ninth sub-pixels, eighteenth view input data VD18 is allocated to the tenth sub-pixels, nineteenth view input data VD19 is allocated to the eleventh sub-pixels, twentieth view input data VD20 is allocated to the twelfth sub-pixels, twenty-first view input data VD21 is allocated to the thirteenth sub-pixels, twenty-second view input data VD22 is allocated to the fourteenth sub-pixels, twenty-third view input data VD23 is allocated to the fifteenth sub-pixels, and twenty-fourth view input data VD24 is allocated to the sixteenth sub-pixels.

Referring back to FIG. 7, the control unit 300 allocates the first view input data to the M-th view image data to the first to N-th sub-pixels based on the first view map VM1 in the first mode (S330).

As described above, the control unit 300 allocates the corresponding view input data to the first to N-th sub-pixels based on the view image data set in the first view map VM1.

For example, an embodiment illustrated in FIG. 10 in which 16 sub-pixels are used will be described. The control unit 300 allocates one of the first view input data to 2N-th view input data to one of the first to N-th sub-pixels. Specifically, according to the first view map VM1, the control unit 300 allocates the ninth view input data VD9 to the first sub-pixels, allocates the tenth view input data VD10 to the second sub-pixels, allocates the eleventh view input data VD11 to the third sub-pixels, allocates the twelfth view input data VD12 to the fourth sub-pixels, allocates the thirteenth view input data VD13 to the fifth sub-pixels, allocates the fourteenth view input data VD14 to the sixth sub-pixels, allocates the fifteenth view input data VD15 to the seventh sub-pixels, allocates the sixteenth view input data VD16 to the eighth sub-pixels, allocates the seventeenth view input data VD17 to the ninth sub-pixels, allocates the eighteenth view input data VD18 to the tenth sub-pixels, allocates the nineteenth view input data VD19 to the eleventh sub-pixels, allocates the twentieth view input data VD20 to the twelfth sub-pixels, allocates the twenty-first view input data VD21 to the thirteenth sub-pixels, allocates the twenty-second view input data VD22 to the fourteenth sub-pixels, allocates the twenty-third view input data VD23 to the fifteenth sub-pixels, and allocates the twenty-fourth view input data VD24 to the sixteenth sub-pixels. Accordingly, each of the first to sixteenth sub-pixels are sequentially newly mapped to different view input data.

However, although FIG. 10 shows that the ninth to twenty-fourth view input data VD9 to VD24 are allocated to each of the first to sixteenth sub-pixels when the 16 sub-pixels are used, embodiments of the disclosure are not necessarily limited thereto and in other embodiments, different view image data is also sequentially allocated thereto.

The control unit 300 generates a first light field image based on the view image data (S340).

The first light field image includes information on a view image that was received from each sub-pixel based on each view image data. For example, when 16 sub-pixels of FIG. 10 are used, the control unit 300 generates a first light field image that includes view image data of the ninth view input data VD9 to the twenty-fourth view input data VD24 that was allocated to the first to sixteenth sub-pixels. In addition, the first light field image includes information on the ninth view image VI9 to the twenty-fourth-view image VI24 of the view image data.

The control unit 300 outputs the first light field image to each of the N sub-pixels (S350).

For example, as illustrated in FIGS. 10 and 11, in an embodiment, when 16 sub-pixels are used, the control unit 300 outputs the first light field image to each of the sub-pixels. Each of the first sub-pixels SP1 to the sixteenth sub-pixels SP16 of the display panel outputs the ninth to twenty-fourth view images VI9 to VI24 based on the view image data in the received first light field image. Specifically, the first sub-pixels SP1 receive ninth view image data and output the ninth view image VI9, the second sub-pixels SP2 receive tenth-view image data and output the tenth view image VI10, the third sub-pixels SP3 receive eleventh view image data and output the eleventh-view image VI11, the fourth sub-pixels SP4 receive twelfth view image data and output the twelfth view image VI12, the fifth sub-pixels SP5 receive thirteenth view image data and output the thirteenth view image VI13, the sixth sub-pixels SP6 receive fourteenth view image data and output the fourteenth view image VI14, the seventh sub-pixels SP7 receive fifteenth view image data and output the fifteenth view image VI15, the eighth sub-pixels SP8 receive sixteenth view image data and output the sixteenth view image VI16, the ninth sub-pixels SP9 receive seventeenth view image data and output the seventeenth view image VI17, the tenth sub-pixels SP10 receive eighteenth view image data and output the eighteenth view image VI18, the eleventh sub-pixels VI11 receive nineteenth view image data and output the nineteenth view image VI19, the twelfth sub-pixels SP12 receive twentieth view image data and output the twentieth view image VI20, the thirteenth sub-pixels SP13 receive twenty-first-view image data and output the twenty-first-view image VI21, the fourteenth sub-pixels SP14 receive twenty-second view image data and output the twenty-second view image VI22, the fifteenth sub-pixels SP15 receive twenty-third view image data and output the twenty-third view image VI23, and the sixteenth sub-pixels SP16 may receive twenty-fourth view image data and output the twenty-fourth view image VI24.

However, when the first to M-th view input data are allocated to the first to N-th sub-pixels as the corresponding first to N-th view image data, a K-th view input data of the first to M-th view input data is not allocated to K-th sub-pixels as K-th corresponding view image data, where K is a natural number that satisfies $1 < K < N$.

Accordingly, referring further to FIG. 11, each of the sub-pixels SP outputs a view image VI to each view area V, and each of the sub-pixels SP displays a stereoscopic image (S600). The N sub-pixels output one of the first to M-th view images. For example, the K-th sub-pixels output a view image in a K-th view area. In an embodiment, the ninth view image VI9 is output to the first view area V1 to which the first sub-pixels SP1 are output. In addition, the twenty-fourth view image VI24 is output to the sixteenth view area V16 to which the sixteenth sub-pixels SP16 are output.

In addition, as different view images are displayed in each view area, the user recognizes a three-dimensionally object at a first object viewing angle ZZ1. For example, in an embodiment, the first to sixteenth sub-pixels SP1 to SP16 display stereoscopic image information of the ninth view image VI9 to the twenty-fourth view image VI24, and the ninth view image VI9 to the twenty-fourth view image VI24 correspond to the first object viewing angle ZZ1.

Referring back to FIG. 7, in an embodiment, when the display device is switched to the second mode (S410), the control unit 300 receives the first view input data VD1 to the M-th view input data VDM and sets a second view map VM2 that allocates corresponding view input data to each of the first to N-th sub-pixels. In addition, in the second mode, the control unit 300 allocates corresponding first view image data to M-th view image data to the first to N-th sub-pixels based on the second view map VM2. In addition, the control unit 300 generate a second light field image based on the view image data of each of the first to N-th sub-pixels. This will be described below with reference to FIGS. 12 to 18.

In addition, when the display device is switched to the third mode (S510), the control unit 300 receives the first view input data VD1 to the M-th view input data VDM and sets a third view map VM3 that allocates corresponding view input data to each of the first to N-th sub-pixels. In addition, in the third mode, the control unit 300 allocates corresponding first view image data to M-th view image data to the first to N-th sub-pixels based on the third view map VM3. In addition, the control unit 300 generates a third light field image based on the view image data of each of the first to N-th sub-pixels. This will be described below with reference to FIGS. 19 to 23.

Although an embodiment describes the ninth view image data to the twenty-fourth view image data as being allocated to each of the first sub-pixels to the sixteenth sub-pixels, and the ninth view image VI9 to the twenty-fourth view image VI24 are output to the first sub-pixels SP1 to the sixteenth sub-pixels SP16, embodiments of the disclosure are not necessarily limited to the number of sub-pixels and the number of input data.

Figure 12:
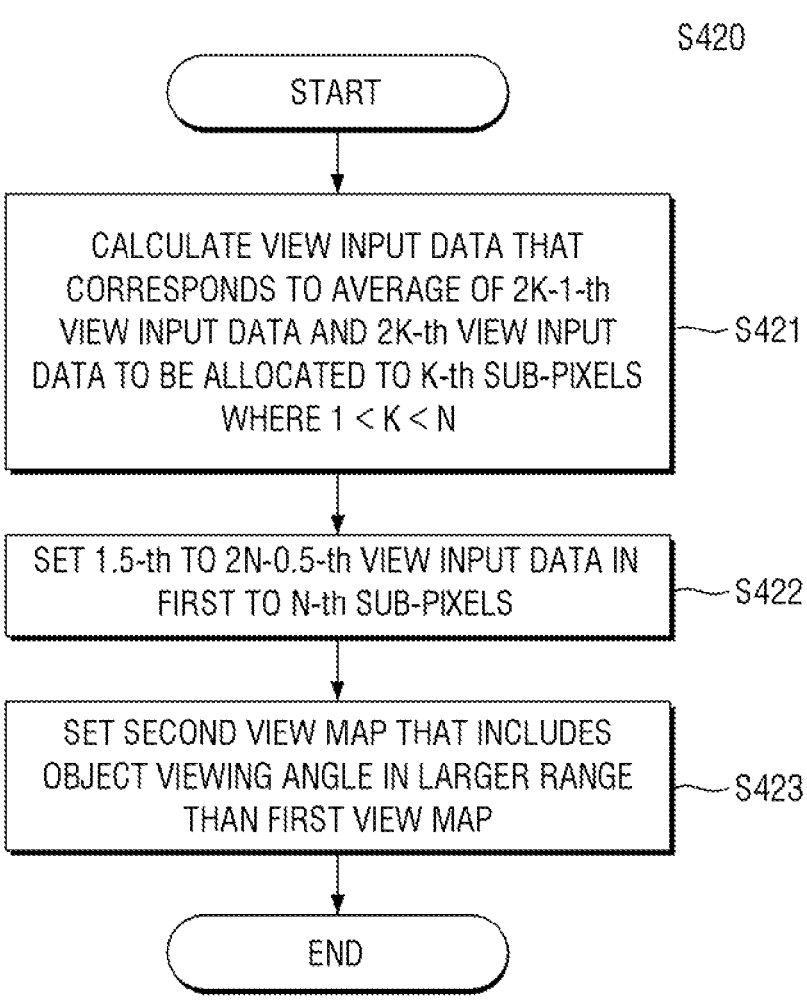
FIG. 12 is a flowchart of a method of setting a view map, according to an embodiment.

FIG. 12 is a flowchart of a method of setting a view map according to an embodiment. FIG. 13 illustrates a second view map when 16 sub-pixels are used, according to an embodiment.

An embodiment of FIGS. 12 and 13 is substantially the same as an embodiment of FIGS. 7 to 11 except for a range for a second view map VM2 and a range for allocating view input data based on the second view map VM2, and thus a repeated description of previously disclosed features will be omitted.

In FIG. 7, in an embodiment, when the display device is switched to the second mode (S410), the control unit 300 receives the first view input data VD1 to the M-th view input data VDM and sets a second view map VM2 that allocates view input data to each of the first to N-th sub-pixels (S420).

FIG. 12 is a flowchart of an embodiment in which N sub-pixels are used and first to 2N-th view input data are received, i.e., when M equals 2N. Referring further to FIG. 12, the control unit 300 calculates view input data to be allocated to each of the N sub-pixels (S421).

Referring to FIGS. 12 and 13, in an embodiment, the control unit 300 receives the first to 2N-th view input data and calculates view input data to be allocated to the N sub-pixels (S421). For example, for K satisfying 1<K<N, the control unit 300 calculates view input data that corresponds to an average of 2K−1-th view input data and 2K view input data to be allocated to K-th sub-pixels. For example, view input data that corresponds to an average of the first view input data VD1 and the second view input data VD2 is calculated as a 1.5-th view data VD1.5.

For example, the average of the view input data includes gradation data that averages brightness information of each view input data VD. For example, the first view input data VD1 and the second view input data VD2 each include gradation data and include brightness information that corresponds to each gradation data. The control unit 300 calculates an average brightness of the brightness information of each of the first view input data VD1 and the second view input data VD2, and calculates gradation data based on the average brightness information. Accordingly, the 1.5-th view data VD1.5 includes gradation data based on the average brightness information of each of the first view input data VD1 and the second view input data VD2.

The control unit 300 sequentially sets 1.5-th view input data to 2N−0.5-th view input data in each of the first to N-th sub-pixels (S422), and sets a second view map VM2 (S423).

For example, the control unit 300 sets the view input data in each of the first to N-th sub-pixels. For example, the control unit 300 sets N view input data to the N sub-pixels. The N view input data includes the N view input data sequentially from the 1.5-th view input data of the first view input data VD1 to the 2N view input data VD2N. For example, an embodiment illustrated in FIG. 13 in which 16 sub-pixels are used and 32 view input data is received will be described. The control unit 300 sets the second view map VM2 so that 1.5-th view input data VD1.5 is allocated to the first sub-pixels SP1, 3.5-th view input data VD3.5 is allocated to the second sub-pixels SP2, 5.5-th view input data VD5.5 is allocated to the third sub-pixels SP3, 7.5-th view input data VD7.5 is allocated to the fourth sub-pixels, 9.5-th view input data VD9.5 is allocated to the fifth sub-pixels, 11.5-th view input data VD11.5 is allocated to the sixth sub-pixels, and 13.5-th view input data VD13.5 is allocated to the seventh sub-pixels.

Accordingly, in the second mode, the control unit 300 allocates (S430) one of the first view input data VD1 to the M-th view input data VDM to the first to N-th sub-pixels based on the second view map VM2. In addition, the control unit 300 generates view image data based on the view input data of each of the first to N-th sub-pixels, and generates (S440) a second light field image based on the view image data.

Therefore, in an embodiment, each sub-pixel SP outputs (S450) a view image VI to each corresponding view area V, and each sub-pixel SP displays a stereoscopic image (S600). The N sub-pixels output one of the first to M-th view images. For example, the K-th sub-pixels output a view image in a K-th view area. In an embodiment, the 1.5-th view image VI1.5 is output to the first view area V1 where the first sub-pixels SP1 are output. In addition, a 31.5-th view image VI31.5 is output to the sixteenth view area V16 where the sixteenth sub-pixels SP16 are output. For example, as described above, the 1.5-th view image VI1.5 includes the gradation data that corresponds to the average brightness of the first view image VI1 and the second view image VI2, and the 31.5-th view image VI31.5 includes gradation data that corresponds to an average brightness of a thirty-second view image VI32 and a thirty-first view image VI31. In addition, as different view images are displayed in each view area, the user three-dimensionally recognizing an object at a second object viewing angle ZZ2. For example, in an embodiment, the first to sixteenth sub-pixels SP1 to SP16 display stereoscopic image information of the 1.5-th view image VI1.5 to the 31.5-th view image VI31.5, and the 1.5-th view image VI1.5 to the 31.5-th view image VI31.5 correspond to the second object viewing angle ZZ2.

In addition, the second object viewing angle (ZZ2 in FIG. 18) in the second mode is greater than the first object viewing angle ZZ1 in the first mode. Since the second mode has a range of the 1.5-th view image VI1.5 to the 31.5-th view image VI31.5 and the first mode has a range of the ninth view image VI9 to the twenty-fourth view image VI24, the second object viewing angle (ZZ2 in FIG. 18) is greater than the first object viewing angle ZZ1. Therefore, the user recognizes a stereoscopic image at larger object viewing angle.

Figure 14:
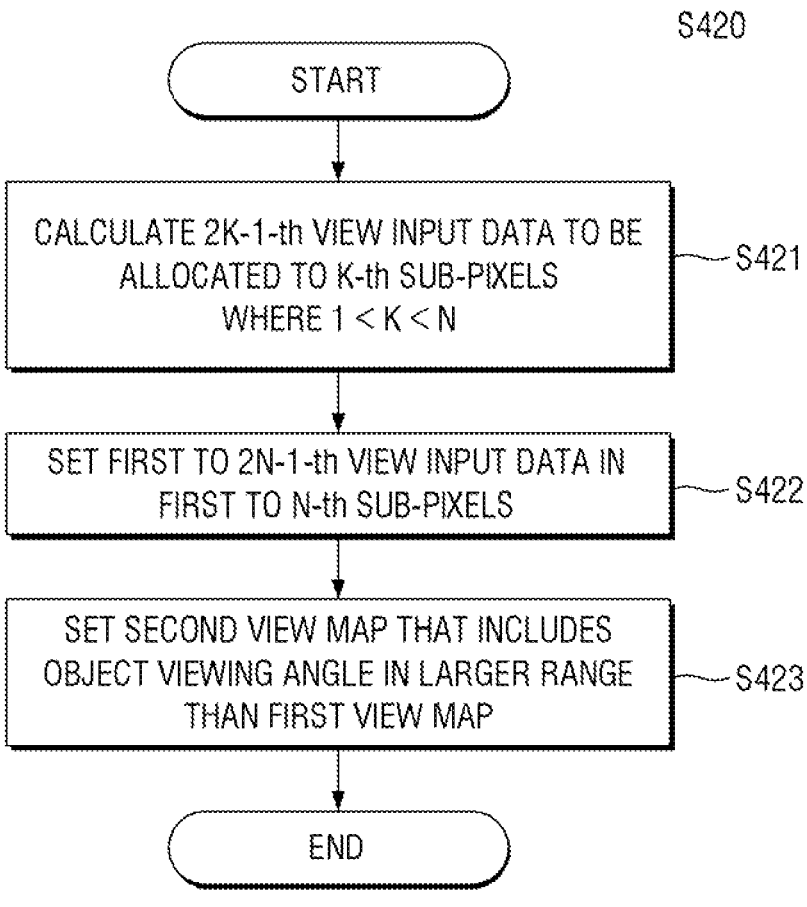
FIG. 14 is a flowchart of a method of setting a view map, according to an embodiment.

FIG. 14 is a flowchart of a method of setting a view map according to an embodiment. FIG. 15 illustrates a second view map when 16 sub-pixels are used, according to an embodiment.

An embodiment of FIGS. 14 and 15 is substantially the same as an embodiment of FIGS. 7 to 11 except for a range for setting a second view map VM2 and a range for allocating view input data based on the second view map VM2, and thus a repeated description of previously disclosed features will be omitted.

FIG. 14 illustrates an embodiment in which N sub-pixels are used and first to 2N-th view input data are received, i.e., when M equals 2N. Referring further to FIG. 14, the control unit 300 calculates view input data to be allocated to each of the N sub-pixels (S421).

Referring to FIGS. 14 and 15, in an embodiment, the control unit 300 receives the first to 2N-th view input data and calculates view input data to be allocated to the N sub-pixels. For example, for K satisfying 1<K<N, the control unit 300 calculates 2K−1-th view input data to be allocated to K-th sub-pixels.

The control unit 300 sequentially sets 1-th view input data to 2N−1-th view input data in each of the first to N-th sub-pixels (S422), and sets a second view map VM2 (S423).

For example, the control unit 300 sets the view input data in each of the first to N-th sub-pixels. For example, the control unit 300 sets N view input data to the N sub-pixels. The N view input data are sequentially set odd-numbered view input data from the first view input data of the first view input data VD1 to the 2N view input data VD2N. For example, an embodiment illustrated in FIG. 15 in which 16 sub-pixels are used and 32 view input data is received will be described. The control unit 300 sets the second view map VM2 so that first view input data VD1 is allocated to the first sub-pixels SP1, third view input data VD3 is allocated to the second sub-pixels SP2, fifth view input data VD5 is allocated to the third sub-pixels SP3, seventh view input data VD7 is allocated to the fourth sub-pixels SP4, ninth view input data VD9 is allocated to the fifth sub-pixels SP5, eleventh view input data VD11 is allocated to the sixth sub-pixels SP6, thirteenth view input data VD13 is allocated to the seventh sub-pixels SP7, fifteenth view input data VD15 is allocated to the eighth sub-pixels SP8, seventeenth view input data VD17 is allocated to the ninth sub-pixels SP9, nineteenth view input data VD19 is allocated to the tenth sub-pixels SP10, twenty-first view input data VD21 is allocated to the eleventh sub-pixels SP11, twenty-third view input data VD23 is allocated to the twelfth sub-pixels SP12, twenty-fifth view input data VD25 is allocated to the thirteenth sub-pixels SP13, twenty-seventh view input data VD27 is allocated to the fourteenth sub-pixels SP14, twenty-ninth view input data VD29 is allocated to the fifteenth sub-pixels SP15, and thirty-first view input data VD31 is allocated to the sixteenth sub-pixels SP16.

Accordingly, in the second mode, the control unit 300 allocates (S430) one of the first view input data VD1 to the M-th view input data VDM to the first to N-th sub-pixels based on the second view map VM2. In addition, the control unit 300 generates (S440) a second light field image based on the view input data of each of the first to N-th sub-pixels.

Therefore, in an embodiment, each sub-pixel SP outputs (S450) a view image VI to each corresponding view area V, and each sub-pixel SP displays a stereoscopic image (S600). The N sub-pixels output one of the first to M-th view images. For example, the K-th sub-pixels output a view image in a K-th view area. In an embodiment, the first view image VI1 is output to the first view area V1 where the first sub-pixels SP1 are output. In addition, the thirty-first view image VI31 is output to the sixteenth view area V16 where the sixteenth sub-pixels SP16 are output.

In addition, as different view images are displayed in each view area, the user may recognizes an object as a stereoscopic image at a second object viewing angle ZZ2. For example, in an embodiment, the first to sixteenth sub-pixels SP1 to SP16 display stereoscopic image information of the first view image VI1 to the thirty-first view image VI31, and the first view image VI1 to the thirty-first view image VI31 correspond to the second object viewing angle ZZ2.

In addition, the second object viewing angle (ZZ2 in FIG. 18) in the second mode is greater than the first object viewing angle ZZ1 in the first mode. Since the second mode has a range from the first view image VI1 to the thirty-first view image VI31 and the first mode has a range from the ninth view image VI9 to the twenty-fourth view image VI24, the second object viewing angle (ZZ2 in FIG. 18) is greater than the first object viewing angle ZZ1. Therefore, the user may recognize the stereoscopic image at a larger object viewing angle.

Figure 16:
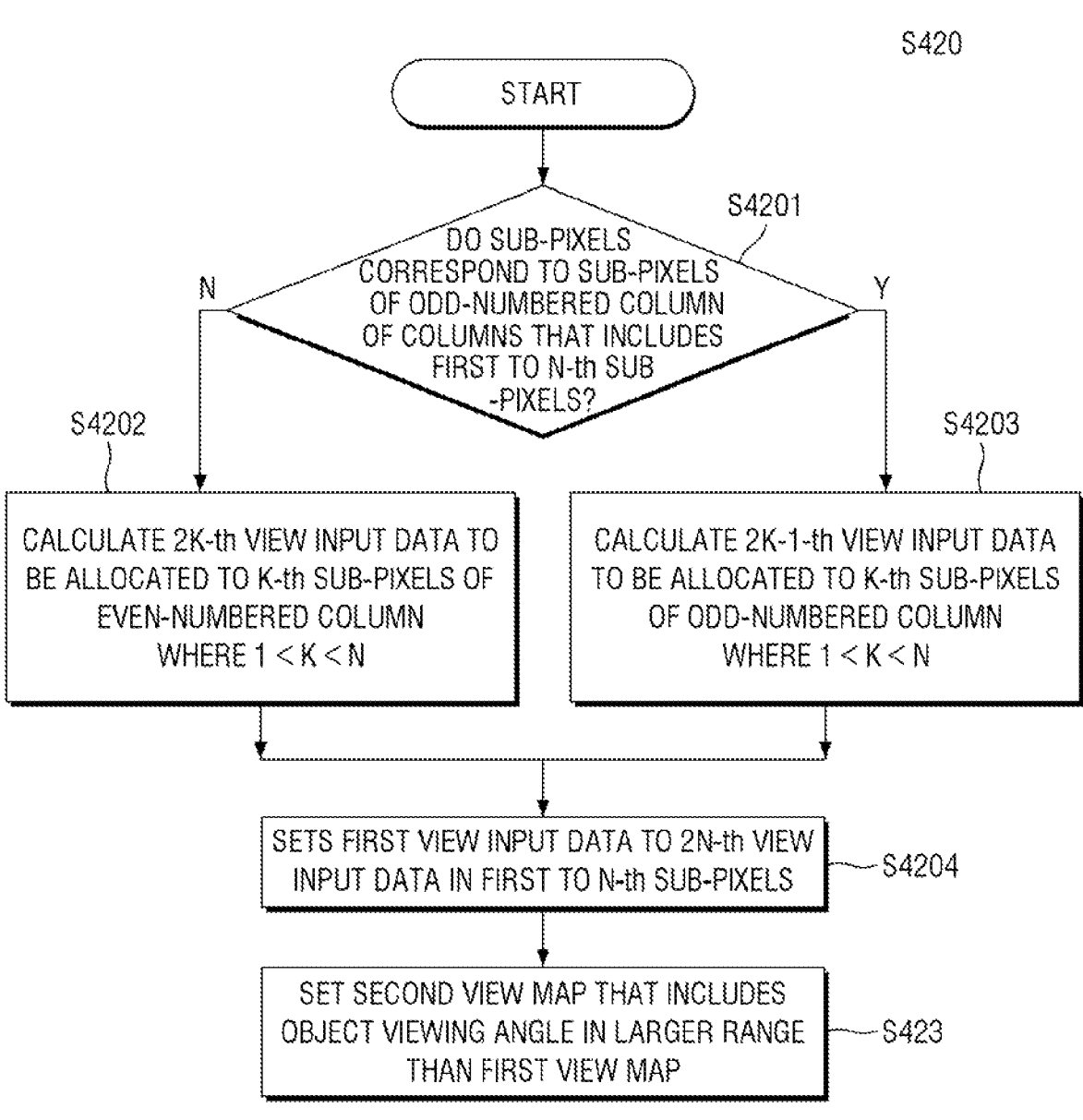
FIG. 16 is a flowchart of a method of setting a view map, according to an embodiment.
Figure 18:
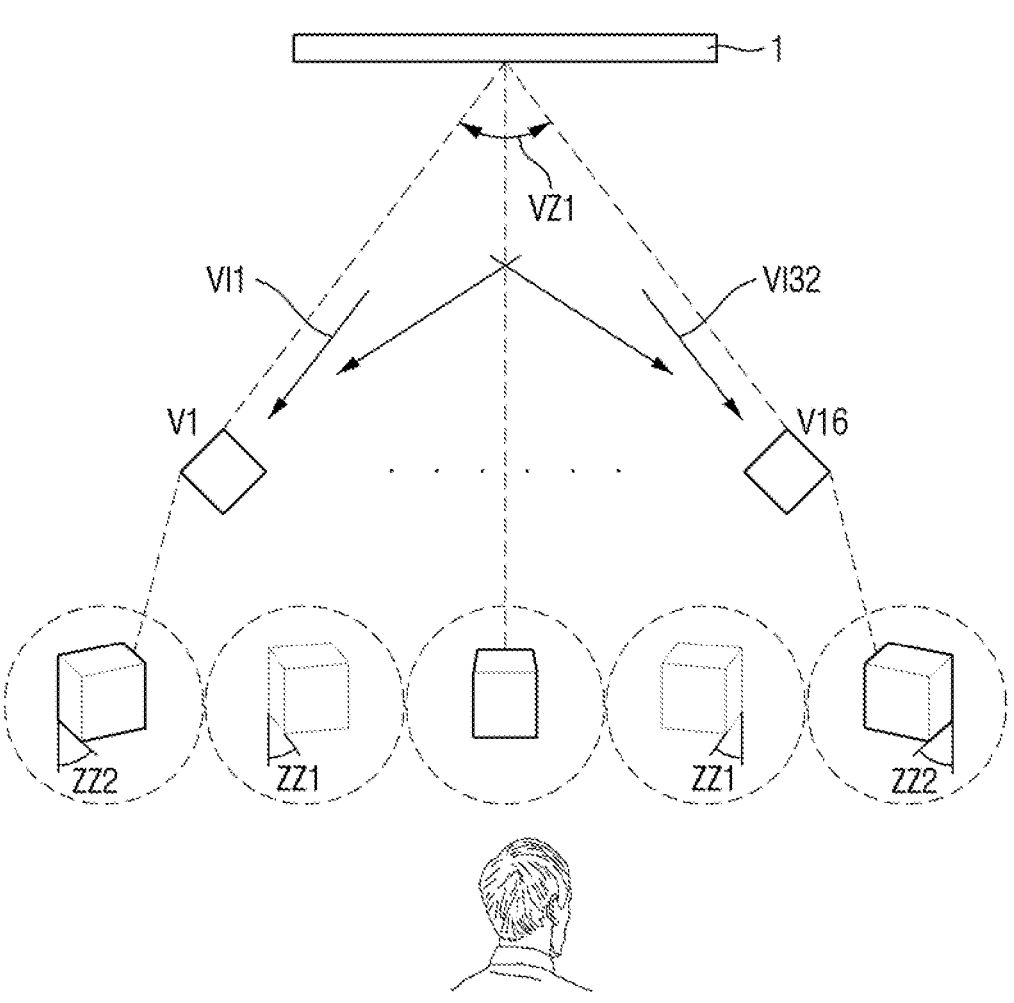
FIG. 18 illustrates a method for displaying a stereoscopic image, according to an embodiment.

FIG. 16 is a flowchart of a method of setting a view map according to an embodiment. FIG. 17 illustrates a second view map when 16 sub-pixels are used according to an embodiment. FIG. 18 illustrates a method for displaying a stereoscopic image according to an embodiment.

An embodiment of FIGS. 16 and 17 is substantially the same as an embodiment of FIGS. 7 to 11 except for a range for setting a second view map VM2 and a range for allocating view input data based on the second view map VM2, and thus a repeated description of previously disclosed features will be omitted.

FIG. 16 illustrates an embodiment in which N sub-pixels are used and first to 2N-th view input data are received, i.e., when M is 2N). Referring further to FIG. 16, the control unit 300 detects whether sub-pixels correspond to the sub-pixels of an odd-numbered column (ODD in FIG. 17) of those columns that include the first to N-th sub-pixels (S4201).

Referring to FIGS. 16 and 17, in an embodiment, if the sub-pixels correspond to the first to N-th sub-pixels of an even-numbered column EVEN (N in S4201), the control unit 300 calculates view input data to be allocated to each of the N sub-pixels of the even-numbered column EVEN (S4202).

The control unit 300 receives the first to 2N-th view input data and calculates the view input data to be allocated to the N sub-pixels. For example, for K satisfying 1<K<N, the control unit 300 calculates 2K-th view input data to be allocated to K-th sub-pixels.

On the other hand, if the sub-pixels correspond to the first to N-th sub-pixels of the odd-numbered column ODD (Y in S3201), the control unit 300 calculates view input data to be allocated to each of the N sub-pixels of the odd-numbered column ODD (S4203).

The control unit 300 receives the first to 2N-th view input data and calculates the view input data to be allocated to the N sub-pixels. For example, for K satisfying 1<K<N, the control unit 300 calculates 2K−1-th view input data to be allocated to K-th sub-pixels.

The control unit 300 sequentially sets first view input data to 2N-th view input data in each of the first to N-th sub-pixels (S4204), and sets a second view map VM2 (S423).

For example, the control unit 300 sets the view input data in each of the first to N-th sub-pixels. For example, the control unit 300 sets N view input data to the N sub-pixels. The N view input data sequentially set odd-numbered view input data from the first view input data of the first view input data VD1 to the 2N view input data VD2N. For example, an embodiment illustrated in FIG. 17 in which 16 sub-pixels are used and 32 view input data is received will be described. The control unit 300 sequentially sets the odd-numbered view input data of the first view input data VD1 to the thirty-first view input data VD31 to the first to sixteenth sub-pixels of the odd-numbered column ODD. In addition, the control unit 300 sequentially sets the even-numbered view input data of the second view input data VD2 to the thirty-second view input data VD32, to the first to sixteenth sub-pixels of the even-numbered column EVEN.

Accordingly, in the second mode, the control unit 300 allocates (S430) one view input data of the first view input data VD1 to the M-th view input data VDM to the first to N-th sub-pixels based on the second view map VM2. In addition, the control unit 300 generates view image data based on the view input data of each of the first to N-th sub-pixels, and generates (S440) a second light field image based on the view image data.

Therefore, referring further to FIG. 18, in an embodiment, each sub-pixel SP outputs (S450) a view image VI to each corresponding view area V, and each sub-pixel SP displays a stereoscopic image (S600). In addition, referring further to FIG. 18, as different view images are displayed in each view area, the user three-dimensionally recognizes an object at a second object viewing angle ZZ2. For example, in an embodiment, the first to sixteenth sub-pixels SP1 to SP16 display stereoscopic image information of the first view image VI1 to the thirty-second view image VI32, and the first view image VI1 to the thirty-second view image VI32 correspond to the second object viewing angle ZZ2.

In addition, the second object viewing angle ZZ2 of the second mode is greater than the first object viewing angle ZZ1 of the first mode. Since the second mode has a range of the first view image VI1 to the thirty-second view image VI32 and the first mode has a range of the ninth view image VI9 to the twenty-fourth view image VI24, the second object viewing angle ZZ2 is greater than the first object viewing angle ZZ1. Therefore, the user may recognize a stereoscopic image at a larger object viewing angle.

Figure 19:
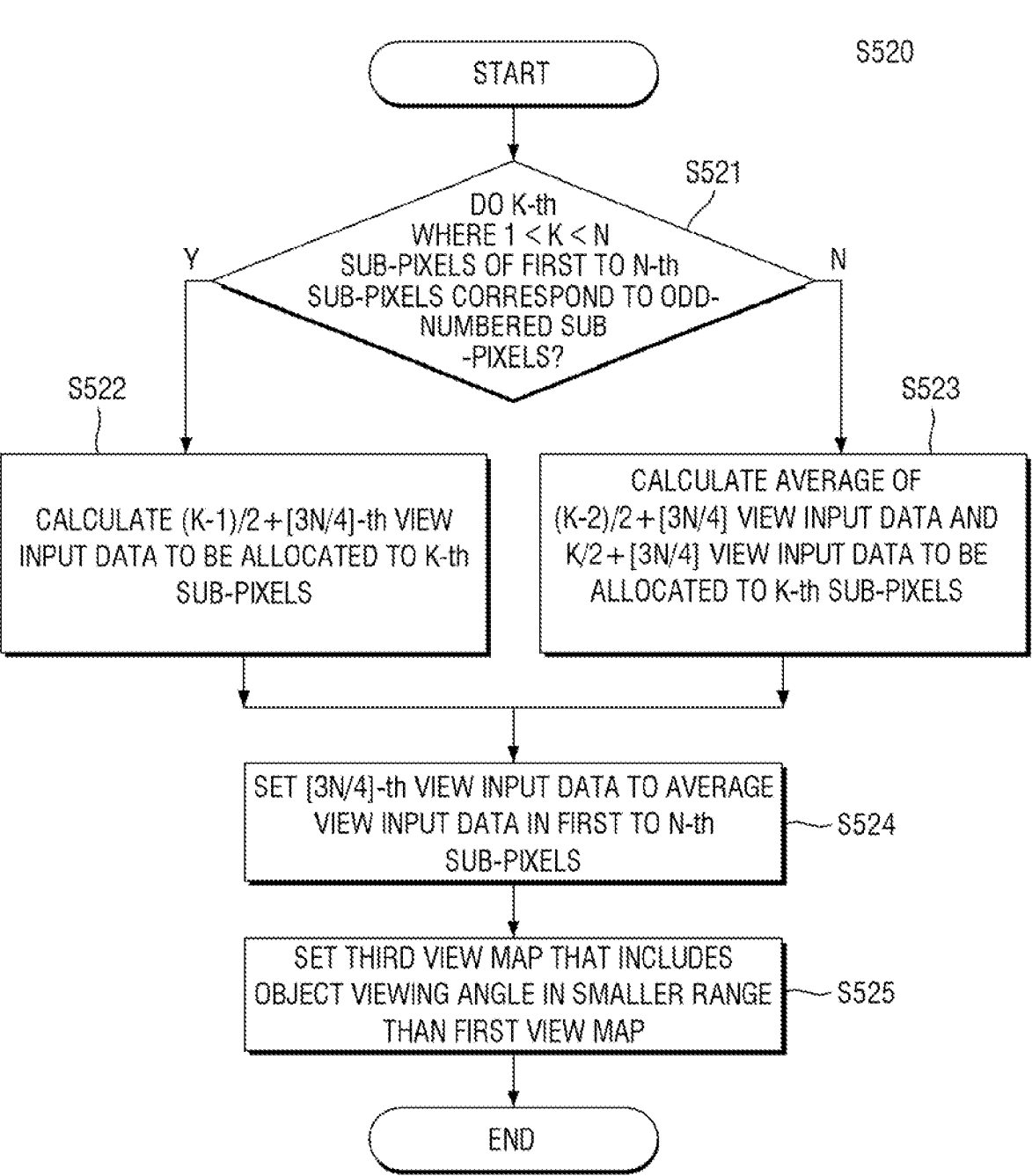
FIG. 19 is a flowchart of a method of setting a view map, according to an embodiment.

FIG. 19 is a flowchart of a method of setting a view map according to an embodiment. FIG. 20 illustrates a third view map when 16 sub-pixels are used, according to an embodiment.

An embodiment of FIGS. 19 and 20 is substantially the same as an embodiment of FIGS. 7 to 11 except for a range for setting a third view map VM3 and a range for allocating view input data based on the third view map VM3, and thus a repeated description of previously described features will be omitted.

In FIG. 19, in an embodiment, when the display device is switched to the third mode (S510), the control unit 300 receives the first view input data VD1 to the M-th view input data VDM and sets a third view map VM3 that allocates view input data to each of the first to N-th sub-pixels (S520).

FIG. 19 is a flowchart of an embodiment in which N sub-pixels are used and first to 2N-th view input data are received, i.e., when M equals 2N). Referring further to FIG. 19, the control unit 300 determines whether the K-th sub-pixels of the first to N-th sub-pixels correspond to odd-numbered sub-pixels (S521), where K is a positive integer that is less than or equal to N.

Referring to FIGS. 19 and 20, in an embodiment, if the K-th sub-pixels correspond to the odd-numbered sub-pixels (Y in S521), the control unit 300 calculates view input data to be allocated to the K-th sub-pixels (S522).

The control unit 300 receives the first to 2N-th view input data and calculates view input data to be allocated to the odd-numbered sub-pixels of the N sub-pixels. For example, for K satisfying 1<K<N, the control unit 300 calculates (K−1)/2+[3N/4]-th view input data to be allocated to the K-th sub-pixels. For example, the control unit 300 calculates the twelfth view input data VD12 to be allocated to the first sub-pixels SP1, and calculates the nineteenth view input data VD19 to be allocated to the fifteenth sub-pixels SP15.

If the K-th sub-pixels correspond to even-numbered sub-pixels (N in S321), the control unit 300 calculates view input data to be allocated to the K-th sub-pixels (S323).

The control unit 300 receives the first to 2N-th view input data and calculates view input data to be allocated to the even-numbered sub-pixels of the N sub-pixels. For example, for K satisfying 1<K<N, the control unit 300 calculates an average value of (K−2)/2+[3N/4]-th view input data and K/2−[3N/4]-th view input data to be allocated to the K-th sub-pixels. For example, the control unit 300 calculates 12.5-th view input data VD12.5 that includes gradation data that corresponds to an average brightness of the twelfth view input data VD12 and the thirteenth view input data VD13 to be allocated to the second sub-pixels SP2, and calculates 19.5-th view input data VD19.5 that includes gradation data that corresponds to an average brightness of the nineteenth view input data VD19 and the twentieth view input data VD20 to be allocated to the sixteenth sub-pixels SP16.

The control unit 300 sequentially sets [3N/4]-th view input data to the (N−1)/2+[3N/4]-th view input data in first to N-th sub-pixels (S524), and sets a third view map VM3 (S525).

Accordingly, the control unit 300 allocates (S530) one view input data of the first view input data VD1 to the M-th view input data VDM to the first to N-th sub-pixels based on the third view map VM3 in the third mode. In addition, the control unit 300 generates view image data based on the view input data of each of the first to N-th sub-pixels, and generates (S540) a third light field image based on the view image data.

Therefore, in an embodiment, each sub-pixel SP outputs (S550) a view image VI to each corresponding view area V, and each sub-pixel SP displays a stereoscopic image (S600). In addition, as different view images are displayed in each view area, the user three-dimensionally recognizes an object at a third object viewing angle ZZ3. For example, in an embodiment, the first to sixteenth sub-pixels SP1 to SP16 display stereoscopic image information of the twelfth view image VI12 to the 19.5-th view image VI19.5, and the twelfth view image VI12 to the 19.5-th view image VI19.5 correspond to the third object viewing angle ZZ3. The 19.5-th view image VI19.5 includes gradation data that corresponds to an average brightness of the nineteenth view image VI19 and the twenty view image VI20.

In addition, the third object viewing angle ZZ3 of the third mode is smaller than the first object viewing angle ZZ1 in the first mode. Since the third mode has a range from the twelfth view image VI12 to the 19.5-th view image VI19.5 and the first mode has a range from the ninth view image VI9 to the twenty-fourth view image VI24, the third object viewing angle ZZ3 is smaller than the first object viewing angle ZZ1. Accordingly, resolution of the same stereoscopic image can be increased.

Figure 21:
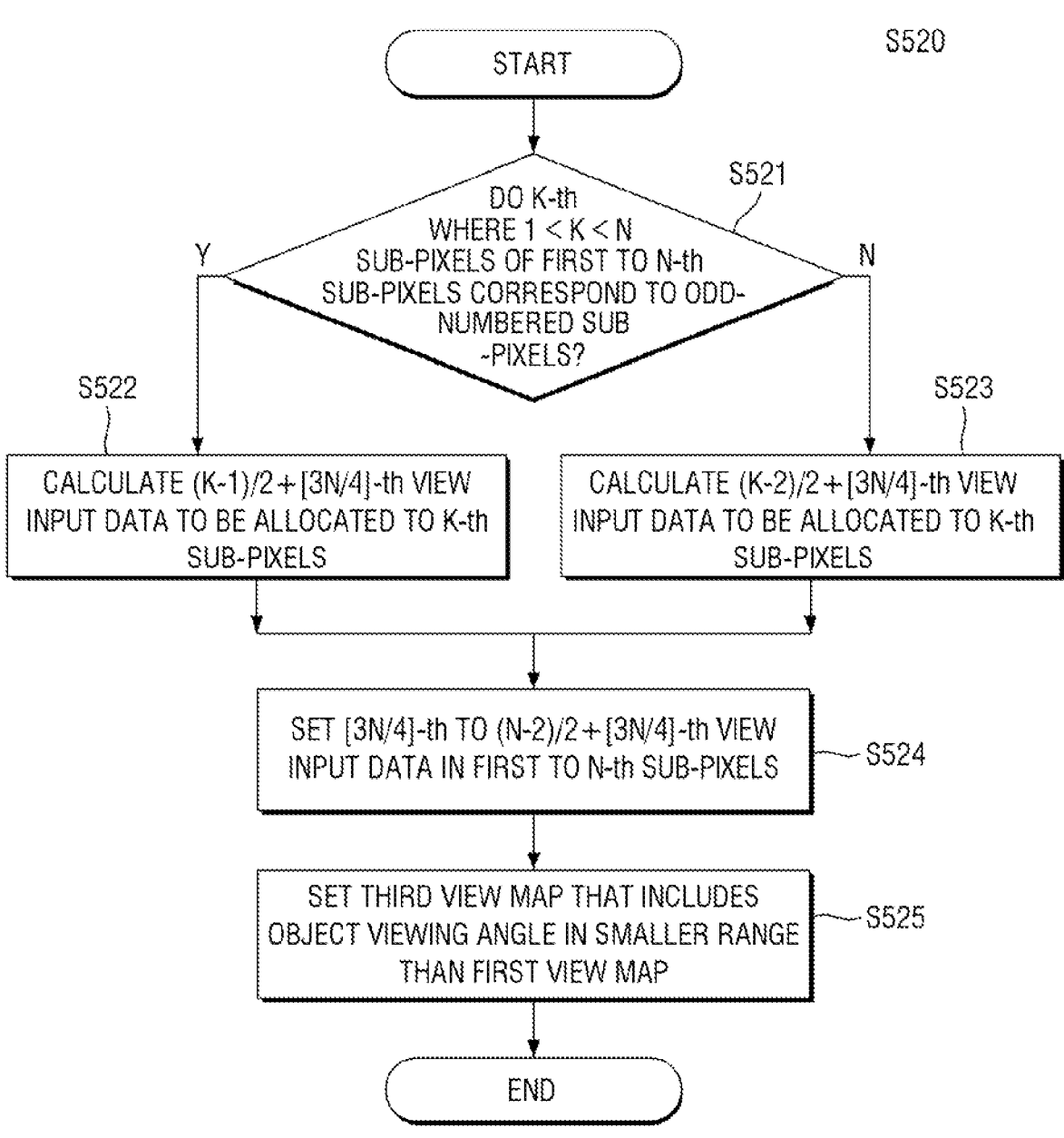
FIG. 21 is a flowchart of a method of setting a view map, according to an embodiment.
Figure 23:
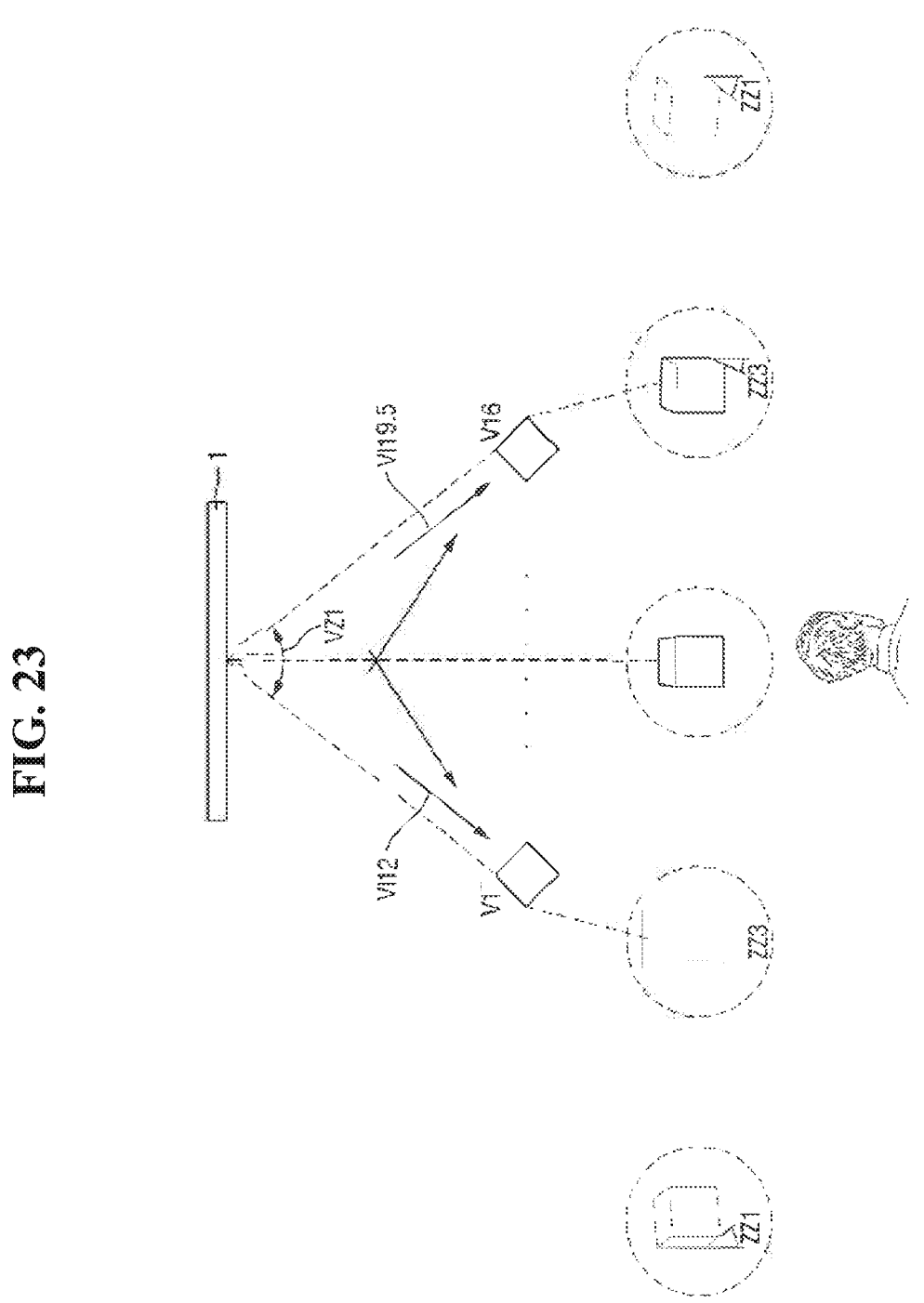
FIG. 23 illustrates a method for displaying a stereoscopic image, according to an embodiment.

FIG. 21 is a flowchart of a method of setting a view map according to an embodiment. FIG. 22 illustrates a third view map when 16 sub-pixels are used, according to an embodiment. FIG. 23 illustrates a method for displaying a stereoscopic image according to an embodiment.

An embodiment of FIGS. 21 to 23 is substantially the same as an embodiment of FIGS. 7 to 11 except for a range for setting a third view map VM3 and a range for allocating view input data based on the third view map VM3, and thus a repeated description of previously described features will be omitted.

FIG. 21 illustrates an embodiment in which N sub-pixels are used and first to 2N-th view input data are received, i.e., when M equals 2N. Referring further to FIG. 21, the control unit 300 determines whether the K-th sub-pixels of the first to N-th sub-pixels correspond to odd-numbered sub-pixels (S521), where K is a positive integer that is less than or equal to N.

Referring to FIGS. 21 and 22, in an embodiment, if the K-th sub-pixels correspond to the odd-numbered sub-pixels (Y in S521), the control unit 300 calculates view input data to be allocated to the K-th sub-pixels (S522).

The control unit 300 receives the first to 2N-th view input data and calculates view input data to be allocated to the odd-numbered sub-pixels of the N sub-pixels. For example, for K satisfying 1<K<N, the control unit 300 calculates (K−1)/2+[3N/4]-th view input data to be allocated to the K-th sub-pixels. For example, the control unit 300 calculates the twelfth view input data VD12 to be allocated to the first sub-pixels SP1, and calculates the nineteenth view input data VD19 to be allocated to the fifteenth sub-pixels SP15.

If the K-th sub-pixels correspond to even-numbered sub-pixels (N in S521), the control unit 300 calculates view input data to be allocated to the K-th sub-pixels (S523).

The control unit 300 receives the first to 2N-th view input data and calculates view input data to be allocated to the even-numbered sub-pixels of the N sub-pixels. For example, for K satisfying 1<K<N, the control unit 300 calculates (K−2)/2+[3N/4]-th view input data to be allocated to the K-th sub-pixels. For example, the control unit 300 calculates the twelfth view input data VD12 to be allocated to the second sub-pixels SP2, and calculates the nineteenth view input data VD19 to be allocated to the sixteenth sub-pixels SP16.

The control unit 300 sequentially sets [3N/4]-th to (N−2)/2+[3N/4]-th view input data in first to N-th sub-pixels (S524), and sets a third view map VM3 (S525).

Accordingly, in the third mode, the control unit 300 allocates (S530) one view input data of the first view input data VD1 to the M-th view input data VDM to the first to N-th sub-pixels based on the third view map VM3. In addition, the control unit 300 generates view image data based on the view input data allocated to each of the first to Nth sub-pixels, and generates (S540) a third light field image based on the view image data.

Therefore, referring further to FIG. 23, in an embodiment, each sub-pixel SP outputs (S550) a view image VI to each corresponding view area V, and each sub-pixel SP displays a stereoscopic image (S600). In addition, referring further to FIG. 23, as different view images are displayed in each view area, a user three-dimensionally recognizes an object at a third object viewing angle ZZ3. For example, in an embodiment, the first to sixteenth sub-pixels SP1 to SP16 display stereoscopic image information from the twelfth view image VI12 to the nineteenth view image VI19, and the twelfth view image VI12 to the nineteenth view image VI19 correspond to the third object viewing angle ZZ3.

In addition, the third object viewing angle ZZ3 of the third mode is smaller than the first object viewing angle ZZ1 of the first mode. Since the third mode has a range from the twelfth view image VI12 to the nineteenth view image VI19 and the first mode has a range from the ninth view image VI9 to the twenty-fourth view image VI24, the third object viewing angle ZZ3 is smaller than the first object viewing angle ZZ1. Accordingly, resolution of the same stereoscopic image can be increased.

Figure 24:
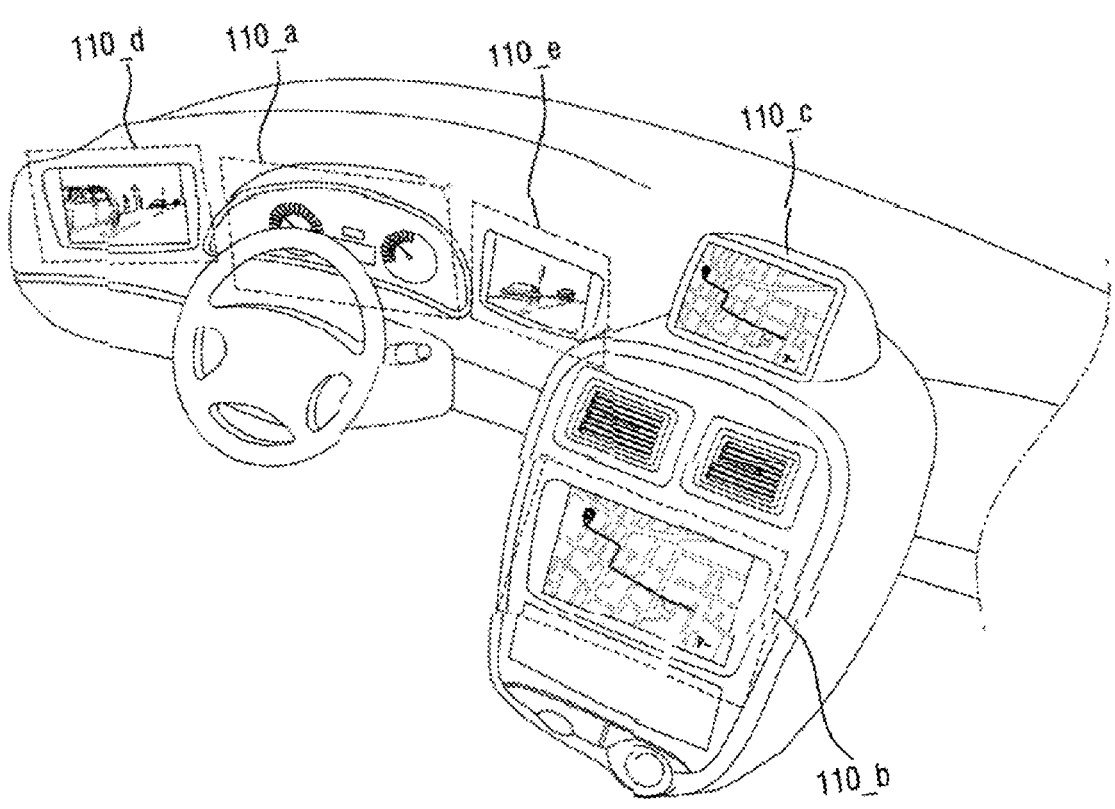
FIG. 24 illustrates an instrument panel and a center fascia of a vehicle that includes a stereoscopic image display device, according to an embodiment.

FIG. 24 illustrates an instrument panel and a center fascia of a vehicle that includes a stereoscopic image display device according to an embodiment.

Referring to FIG. 24, in an embodiment, a stereoscopic image display device according to an embodiment of the disclosure in which the display panel 110 and the three-dimensional lenses 220 are bonded can be incorporated into an instrument panel 110_a of a vehicle, a center fascia 110_b of the vehicle, or a center information display (CID) 110_c disposed on a dashboard of the vehicle. In addition, a display device according to an embodiment can also be incorporated into a room minor display (110_d and 110_e) instead of a side mirror of a vehicle, a navigation device, etc.

Figure 25:
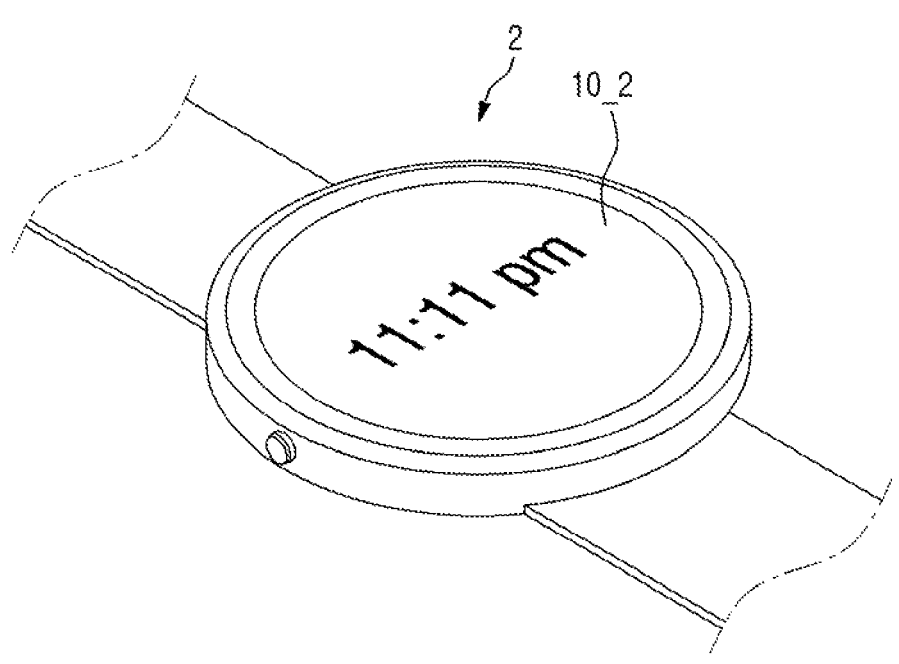
FIG. 25 illustrates a watch-type smart device that includes a stereoscopic image display device, according to an embodiment.

FIG. 25 illustrates a watch-type smart device that includes a stereoscopic image display device according to an embodiment. Referring to FIG. 25, a display panel 10_2 to which the three-dimensional lenses 220 are bonded is also incorporated into a watch-type smart device 2.

Figure 26:
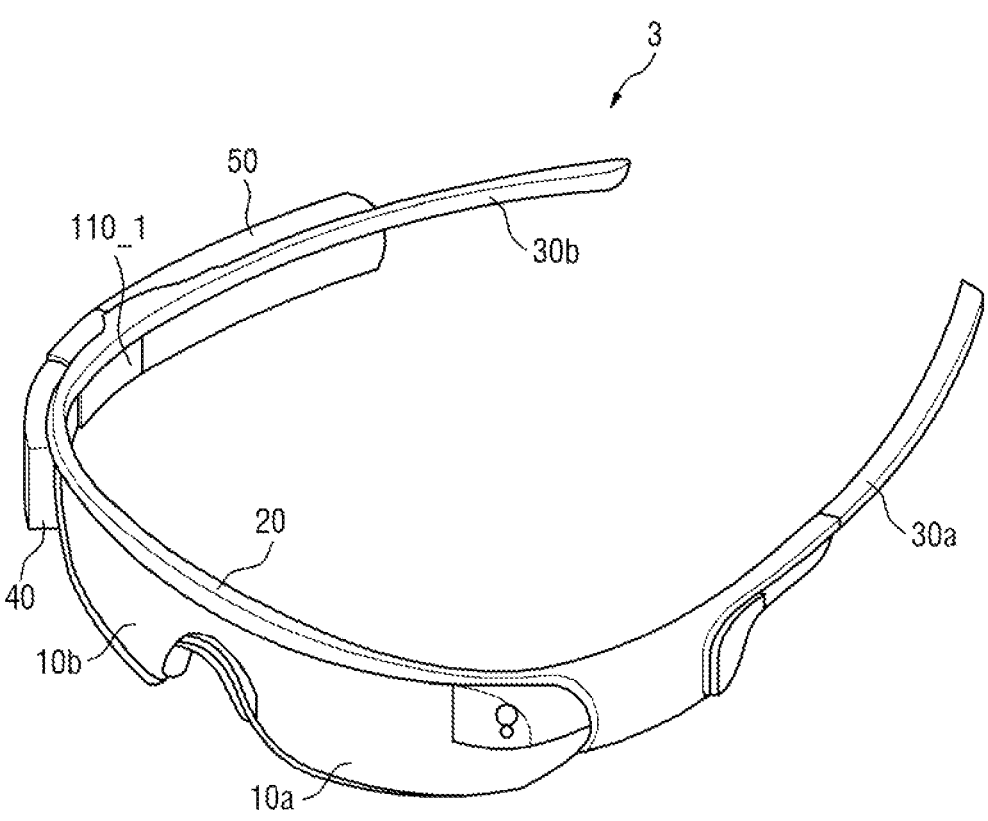
FIG. 26 illustrates a glasses-type virtual reality device that includes a stereoscopic image display device, according to an embodiment.

FIG. 26 illustrates a glasses-type virtual reality device that includes a stereoscopic image display device according to an embodiment. FIG. 26 illustrates a glasses-type virtual reality device 1 that includes glasses frame legs 30a and 30b. The glasses-type virtual reality device 1 according to an embodiment includes a display device 110_1, a left eye lens 10a, a right eye lens 10b, a support frame 20, glasses frame legs 30a and 30b, a reflective member 40, and a display device accommodating portion 50.

The glasses-type virtual reality device 1 according to an embodiment can also be incorporated into a head mounted display that includes a head mounted band that is mounted on a user's head instead of the glasses frame legs 30a and 30b. For example, the glasses-type virtual reality device 1 according to an embodiment is not limited to that illustrated in FIG. 26, and can be incorporated in various forms into various other electronic devices.

The display device accommodating portion 50 includes a display device 110_1, such as a micro LED display device, and a reflective member 40. An image displayed on the display device 110_1 is reflected by the reflective member 40 and provided to a user's right eye through the right eye lens 10b. Accordingly, a user may view a virtual reality image displayed on the display device through the right eye.

Although FIG. 26 illustrates that the display device accommodating portion 50 is disposed at a right distal end of the support frame 20, an embodiment of the disclosure is not necessarily limited thereto. For example, in an embodiment, the display device accommodating portion 50 is disposed at a left distal end of the support frame 20. For example, an image displayed on the display device 110_1 is reflected by the reflective member 40 and provided to a user's left eye through the left eye lens 10a. Accordingly, the user may view a virtual reality image displayed on the display device 110_1 through the left eye. Alternatively, the display device accommodating portions 50 is disposed at both the left and right distal ends of the support frame 20. For example, the user views a virtual reality image displayed on the display device 110_1 through both the left and right eyes.

Figure 27:
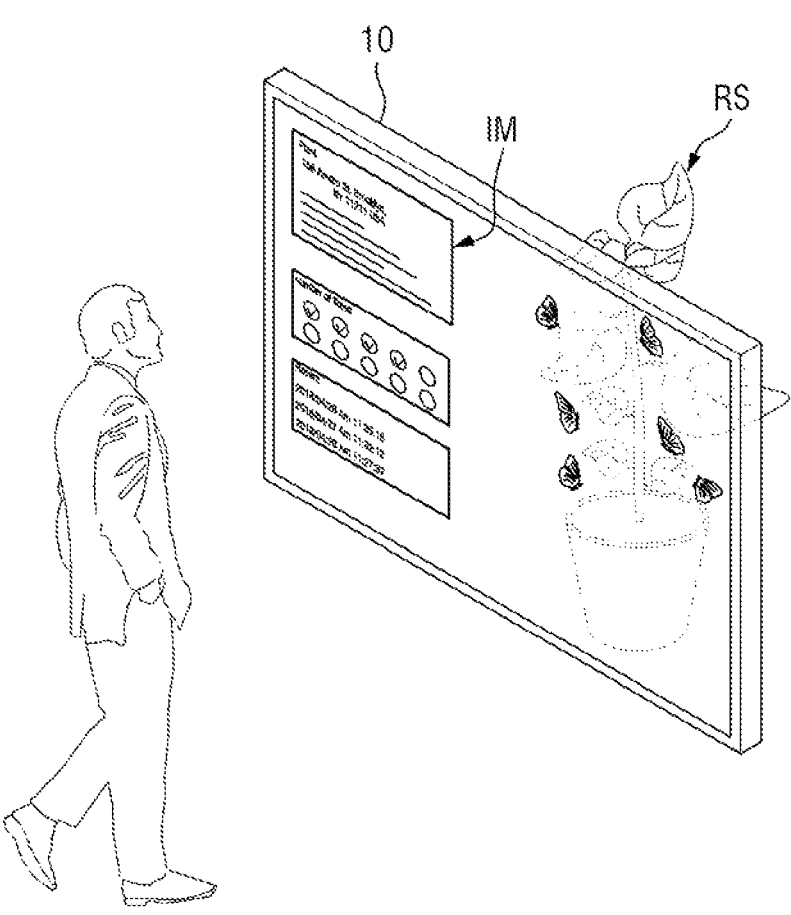
FIG. 27 illustrates a transparent display device that includes a stereoscopic image display device, according to an embodiment.

FIG. 27 illustrates a transparent display device 10 that includes a stereoscopic image display device according to an embodiment.

Referring to FIG. 27, in an embodiment, a display device in which the display panel 110 and the three-dimensional lenses 220 are bonded can be incorporated into a transparent display device 10. The transparent display device 10 transmits light while displaying an image IM. Therefore, a user positioned in front of the transparent display device 10 not only views the image IM displayed on the display panel 110, but also sees an object RS or a background positioned in back of the transparent display device 10. When the display device in which the display panel 110 and the three-dimensional lenses 220 are bonded is incorporated into the transparent display device 10, the display panel includes a light transmitting portion that transmits light or is formed of a material that transmits light.

In concluding the detailed description, those skilled in the art will appreciate that many variations and modifications can be made to embodiments without substantially departing from the principles of embodiments of the disclosure. Therefore, embodiments of the invention are used in a generic and descriptive sense only and not for purposes of limitation.

What is claimed is:

1. A method for providing a stereoscopic image of a display device, the method comprising:

receiving, by a display panel that includes first to N-th sub-pixels, wherein N is a positive integer that is greater than or equal to 2, first to M-th view input data that corresponds to first to M-th view images, wherein M is a positive integer that satisfies M>N, allocating the first to M-th view input data to the first to N-th sub-pixels as corresponding first to N-th view image data in a first mode, wherein the first mode is a normal 3-dimensional (3D) display mode; and displaying, by plurality of lenses disposed on the display panel, a light field image in the first to N-th sub-pixels according to the first to N-th view image data.

2. The method of claim 1, wherein when allocating the first to M-th view input data to the first to N-th sub-pixels as the corresponding first to N-th view image data, one K-th view input data of the first to M-th view input data is not allocated to K-th sub-pixels as K-th corresponding view image data, wherein K is a natural number that satisfies 1<K<N.

3. The method of claim 1, wherein each of the first to N-th sub-pixels receives one view image data of the first to N-th view image data.

4. The method of claim 3, wherein each of the first to N-th sub-pixels outputs one view image of the first to M-th view images.

5. The method of claim 4, wherein one S-th view image, wherein S is a positive integer that satisfies 1<S<N, of the first to N-th view images is output to an S-th view area of first to N-th view areas.

6. The method of claim 1, wherein allocating the first to M-th view input data to the first to N-th sub-pixels as the corresponding first to N-th view image data in the first mode includes receiving the first to M-th view input data and allocating K-th to K+N-1-th view image data, wherein K is a natural number that satisfies 1<K<N.

7. The method of claim 6, further comprising, when first to 2N-th view input data are received, allocating 1+[N/2]-th to N+[N/2]-th view image data, and generating a first light field image based on the 1+[N/2]-th to N+[N/2]-th view image data.

8. The method of claim 7, further comprising outputting the first light field image to each of the first to N-th sub-pixels, wherein the first to N-th sub-pixels output an image of the 1+[N/2]-th to N+[N/2]-th view image data, respectively.

9. The method of claim 1, further comprising receiving the first to M-th view input data that corresponds to the first to M-th view images, wherein M is a positive integer that satisfies M>N, allocating the first to M-th view input data to the first to N-th sub-pixels as the corresponding first to N-th view image data in a second mode, wherein the second mode is a low-resolution 3D mode for outputting a viewing angle of an object greater than the viewing angle of the object in the first mode, and when first to 2N-th view input data are received in the second mode, allocating a corresponding 2L−1 view image data to an L-th sub-pixels, wherein L is a positive integer that satisfies L<N.

10. The method of claim 9, further comprising generating a second light field image based on first to 2N-1-th view image data.

11. The method of claim 10, further comprising outputting the second light field image to each of the first to N-th sub-pixels, wherein the first to N-th sub-pixels output an image of the first to 2N-1-th view image data, respectively.

12. The method of claim 1, further comprising receiving the first to M-th view input data that correspond to the first to M-th view images, wherein M is a positive integer that satisfies M>N, allocating the first to M-th view input data to the first to N-th sub-pixels as the corresponding first to N-th view image data in a second mode, wherein the second mode is a low-resolution 3D mode for outputting a viewing angle of an object greater than the viewing angle of the object in the first mode, and when in the second mode, allocating view image data that corresponds to a gradation value that corresponds to an average brightness of corresponding 2L view input data and 2L−1 view input data to one L-th sub-pixels of the first to N-th sub-pixels, wherein L is a positive integer that satisfies L<N.

13. The method of claim 1, further comprising receiving the first to M-th view input data that correspond to the first to M-th view images, wherein M is a positive integer that satisfies M>N, allocating the first to M-th view input data to the first to N-th sub-pixels as the corresponding first to N-th view image data in a third mode, wherein the third mode is a high-resolution 3D mode for outputting a viewing angle of an object smaller than the viewing angle of the object in the first mode and when first to 2N-th view image data are received in the third mode, allocating a corresponding (P−1)/2+[3N/4]-th view image data to P sub-pixels of the first to N-th sub-pixels, wherein P is a positive integer that satisfies P<N.

14. The method of claim 13, further comprising generating a third light field image based on [3N/4]-th view image data to (N−2)/2+[3N/4]-th view image data.

15. The method of claim 14, further comprising outputting the third light field image to each of the first to N-th sub-pixels, wherein the first to N-th sub-pixels output an image of the [3N/4]-th to (N−2)/2+[3N/4]-th view image data, respectively.

16. The method of claim 1, wherein a same view input data is allocated to each of an Rth sub-pixel and an R+1-th sub-pixel of the first to N-th sub-pixels, wherein R is a positive integer that satisfies R<N.

17. A display device, comprising:

a display panel that includes first to N-th sub-pixels to which first to N-th view images are allocated, wherein N is a positive integer that satisfies N≥2;

a plurality of lenses disposed on the display panel and that project the first to N-th view images in first to N-th view areas, respectively; and a control unit that receives first to M-th view input data that corresponds to first to M-th view images, wherein M is a positive integer that satisfies M>N, and allocates the first to M-th view input data to the first to N-th sub-pixels as corresponding first to N-th view image data in a first mode, wherein the first mode is a normal 3-dimensional (3D) display mode.

18. The display device of claim 17, wherein the control unit generates a light field image based on the first to N-th view image data.

19. The display device of claim 18, wherein the control unit receives the first to M-th view input data and allocates K-th view to K+N−1-th view image data in the first mode.

20. An electronic device, comprising:

a display panel that includes first to N-th sub-pixels to which first to N-th view images are allocated, wherein N is a positive integer that satisfies N≥2;

a plurality of lenses disposed on the display panel and that project the first to N-th view images in first to N-th view areas, respectively; and a control unit that receives first to M-th view input data that corresponds to first to M-th view images, wherein M is a positive integer that satisfies M>N, and allocates the first to M-th view input data to the first to N-th sub-pixels as corresponding first to N-th view image data in a first mode, wherein the first mode is a normal 3-dimensional (3D) display mode.

\* \* \* \* \*